United States Patent [19]

Lawton

[11] Patent Number: 4,974,187
[45] Date of Patent: Nov. 27, 1990

[54] MODULAR DIGITAL SIGNAL PROCESSING SYSTEM

[75] Inventor: Wayne M. Lawton, Cambridge, Mass.

[73] Assignee: Aware, Inc., Cambridge, Mass.

[21] Appl. No.: 388,384

[22] Filed: Aug. 2, 1989

[51] Int. Cl.$^5$ .......................................... G06F 15/336
[52] U.S. Cl. ................................................ 364/728.01
[58] Field of Search ...................... 364/728.01, 728.03, 364/728.05, 715.01, 724.12; 382/42

[56] References Cited

U.S. PATENT DOCUMENTS 4,694,407  9/1987  Ogden ......................... 364/728.01 X
4,811,271  3/1989  Svoboda et al. ................ 364/728.01

OTHER PUBLICATIONS

Crochiere et al., *Multirate Digital Signal Processing*, pp. 378–392, (1983).
Daubechies, et al., "Painless Nonorthogonal Expansions", *J. Math. Phys.*, vol. 27, pp. 1271–1283 (1986).
Daubechies, "Orthonormal Bases of Compactly Supported Wavelets", *Technical Report* AT&T Bell Laboratories (1987).
Coifman, R. et al., "The Discrete Wavelet Transform", (1987), preprint referenced in Daubechies (above) on p. 95.
Goupillaud, et al., "Cycle-Octave and Related Transforms in Seismic Signal Analysis", *Geoexploration*, vol. 23, pp. 85–102, (1984).
Grossman, A. et al., "Transforms Associated to Square–Integrable Group Representations, I: General Results", *J. Math. Phys.*, vol. 26, pp. 2473–2479, (1985).
Grossman, et al., "Transforms Associated to Square-Integrable Group Representations, II: Examples", *Ann. Inst. H. Poincare*, vol. 45, pp. 293–309 (1986).
Grossman, A., et al., "Decomposition of Hardy into Square–Integrable Functions of Constant Shape", *SIAM J. Math. Anal.*, vol. 15, pp. 723–736, (1984).
Grossman, et al., "Decomposition of Functions into Wavelets of Constant Shape and Related Transforms", University of Bielefeld Report No. 11 (1984), published in Striet, L., ed., *Mathematics and Physics I*, World Scientific Publishing Co., Singapore, pp. 135–165 (1987).
Kronland-Martinet, R. et al., "Analysis of Sounds through Wavelet Transforms", Int'l. J. Pattern Analysis and Artificial Intellgence, vol. 1, pp. 1–8, (1987).
Mallat, "A Theory for Multiresolution Signal Decomposition: The Wavelet Representation", *U. Penn. Report No. MS–CIS–87–22*, (1987).
Mallet, "Multiresolution Approximation and Wavelets", *U. Penn. Report No. MS–CIS–87–87, (1987)*.
Marr, *Vision*, H. Freeman & Co., pp. 61–67 (1982).
Meyer, Y. et al., "L'Analyse par Ondelettes", *Pour la Science*, pp. 28–37 (1987).
Pratt, *Digital Image Processing*, J. Wiley & Sons, pp. 254–257, (1987).
Tuteur, "Wavelet Transformations in Signal Detection", *Proc. 1988 Int'l. Conf. on Accoustics, Speech and Signal Processing*, pp. 1435–1438 (1988).

Primary Examiner—Dale M. Shaw
Assistant Examiner—Tan V. Mai
Attorney, Agent, or Firm—Spencer & Frank

[57] ABSTRACT

A modular digital signal processor system for calculating "wavelet-analysis transformations" and "wavelet-synthesis transformations" of one-dimensional numerical data and multi-dimensional numerical data for solving speech processing and other problems. The system includes one or more "dual-convolver" components, "analyzer-adjunct" components, "synthesizer-adjunct" components, "de-interleaver components" and "interleaver components", and specific configurations of these components for implementing specific functions. Each dual-convolver is capable of loading a finite number of numerical values into its coefficient registers and subsequently performing two convolution operations on input sequences of numerical values to produce an output sequence of numerical values. Two dual-convolvers are configured with an analyzer adjunct or synthesizer adjunct to respectively build a single stage analyzer or synthesizer. Analyzers and synthesizers are configured in conjunction with interleavers and de-interleaver components to build wavelet sub-band processors capable of decomposing one-dimensional sequences of numerical data or multi-dimensional arrays of numerical data into constituent wavelets and to synthesize the original sequences or arrays from their constituent wavelets. Synthesizers are configured with interleavers to build function generators capable of calculating functions including wavelet functions to within any specified degree of detail.

37 Claims, 14 Drawing Sheets

| OPERATION | SYMBOL | DESCRIPTION |
|---|---|---|
| K SAMPLE DELAY |  | $Y(m) = X(m-K)$ |
| GAIN |  | $Y(m) = gX(m)$ |
| GAIN AND DELAY |  | $Y(m) = gX(m-K)$ |
| ADDITION |  | $Y(m) = X_1(m) + X_2(m)$ |
| MULTIPLICATION |  | $Y(m) = X_1(m)X_2(m)$ |
| COMMUTATOR |  | $Y(m) = X_1(m)$, m even<br>$Y(m) = X_2(m)$, m odd |

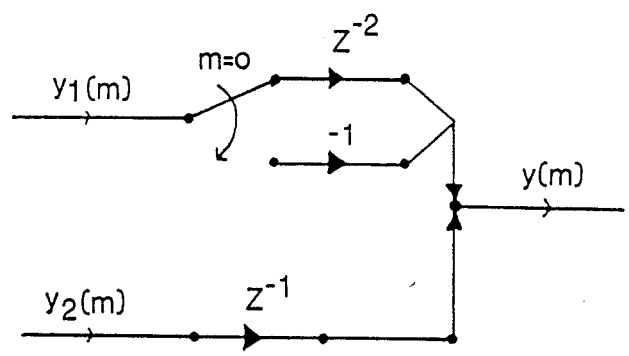
FIG. 3
FIG. 4
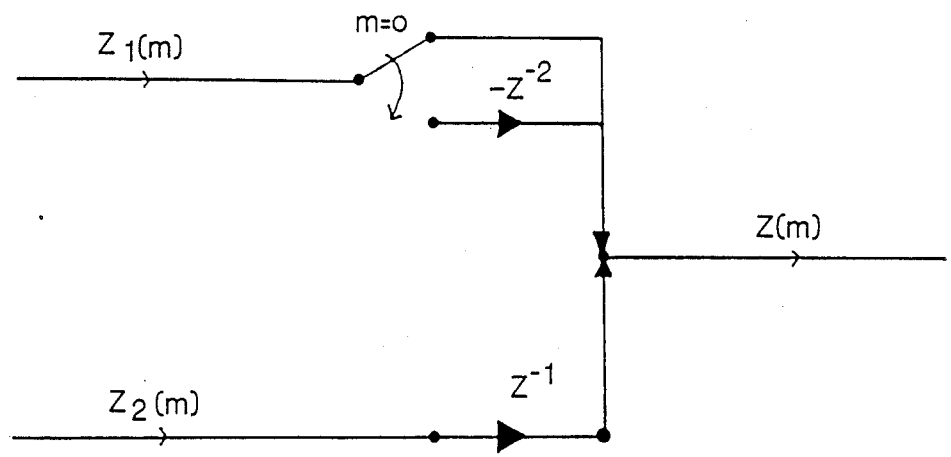

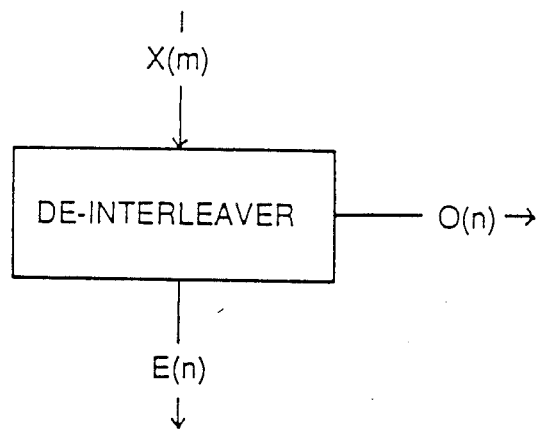
FIG. 7a
FIG. 7b
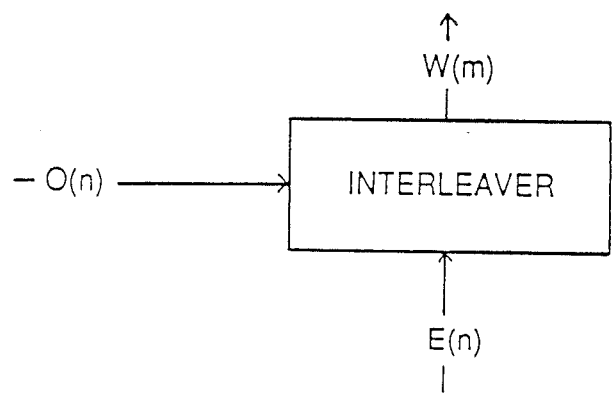

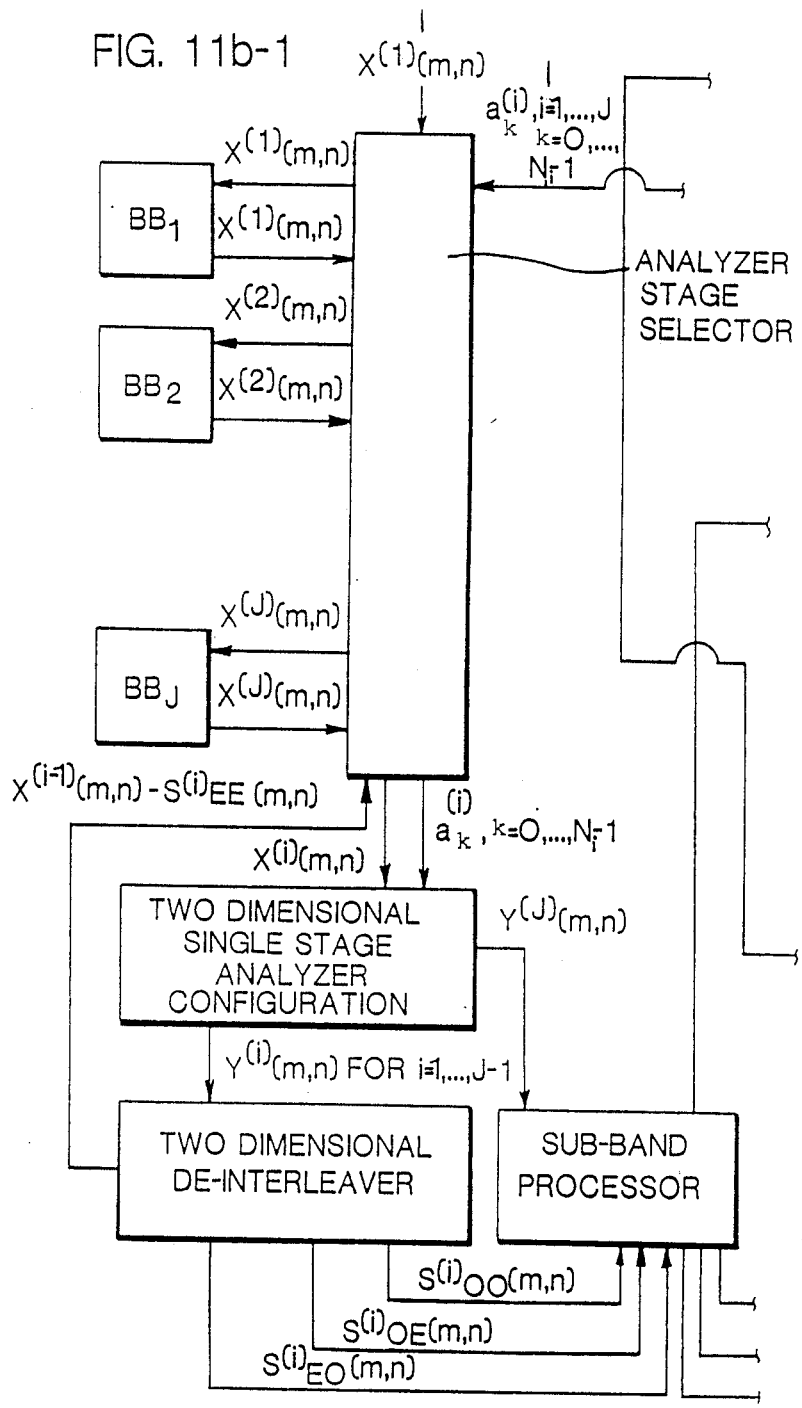

MODULAR DIGITAL SIGNAL PROCESSING SYSTEM

BACKGROUND OF THE INVENTION

The invention is directed to a digital signal processor system, and more particularly to a system for processing one dimensional numerical data and multi-dimensional numerical data for solving speech and image processing problems, differential equation problems and the like, by transforming the data into a wavelet form for analysis and then synthesizing the original data, using modular elements to perform specific operations, including wavelet transforms, on input sequences and arrays of numerical data.

The text *Multirate Digital Signal Processing*, Crochiere et al, 1983 at pages 378–392 and references cited therein at pages 396–404 describe generic digital hardware realizations for implementing (i) a class of elementary digital signal processing operations known in the art of digital signal processing as quadrature mirror filters, and (ii) single side-band filter bank operations employing quadrature mirror filters.

The hardware realizations described in Crochiere et al consist of hardware components together with specific configurations of these components that are capable of performing single-side band quadrature mirror filter bank operations on input sequences of numerical data, herein called input signals. Filter bank operations consist of analysis operations that decompose input signals into constituent component signals and of synthesis operations that reconstruct the input signal from its constituent component signals. Filter bank operations have great utility in speech data compression and other digital signal processing applications. The hardware components described in Crochiere et al are described generically as low pass filters, high pass filters, downsamplers, and upsamplers. Specific designs for these component are not described in detail.

One useful type of analysis is performed using wavelet transforms. Mallat in a paper entitled "A Theory for Multiresolution Signal Decomposition: The Wavelet Representation", Department of Computer and Information Science, School of Engineering and Applied Science, *University of Pennsylvania Report* No. MS-CIS-87-22, GRASP LAB 103, May 1987 (hereinafter "Mallat 1", discusses a generic class of mathematical wavelet transforms and describes a pyramid architecture using quadrature mirror filters for efficiently calculating wavelet transforms. These pyramid architectures consist of:

(i) the single-side band quadrature mirror filter bank described in Crochiere et al for analyzing and for synthesizing one-dimensional signals, and (ii) a pyramid architecture utilizing the same components as the architecture in (i) that are configured for computing two-dimensional wavelet transforms. The components described in Mallat 1 are described generically as low-pass filters, high-pass filters, downsamplers, and upsamplers. Specific designs for these components are not described in detail, and neither Crochiere et al or Mallat 1 describe configurations of hardware components for generation wavelet basis functions nor solving differential equations.

The use of wavelet theory and its associated transforms for performing useful digital signal processing and digital image processing is well established and specific applications in such fields as signal processing in seismic signal analysis, acoustics and speech compression and synthesis are discussed in Goupillaud et al, "Cycle-octave and Related Transforms in Seismic Signal Analysis", *J. Math Phys.*, Vol. 26, p. 2473, 1985; Kronland-Martinet et al, "Analysis of Sounds Through Wavelet Transforms," *Int'l J. Pattern Analysis and Artificial Intelligence*, Vol 1, January 1987 (hereinafter "Kronland-Martinet") and Tuteur, "Wavelet Transformations in Signal Detection", *Proc.* 1988 *Int'l Conf on Acoustics, Speech and Signal Processing*, pp 1435–1438, 1988. It has been observed that the properties of wavelets are advantageous for (i) dealing with local properties of signals and images and (ii) for performing multiresolution analysis for signals and images. The importance of both of these tasks and the advantageous use of wavelets in this regard are generally acknowledged among those accomplished in the art. See, for example, Mallat 1; Mallat, Steven G., "Multiresolution Approximation and Wavelets," Department of Computer and Information Science, School of Engineering and Applied Science, *University of Pennsylvania Report* No. MS-CIS-87-87, GRASP LAB 80, September 1987 (hereinafter "Mallat 2"); Marr, *Vision*, H. Freeman & Co. 1982; and Pratt, *Image Processing*, J. Wiley & Sons, 1987.

SUMMARY OF THE INVENTION

It is therefore an object of the invention to provide an efficient and economical design of a system for transforming one dimensional numerical data and multi-dimensional numerical data for solving speech and image processing problems, differential equation problems and the like by transforming the data into a wavelet form for analysis and then synthesizing the original data, using novel modular elements to perform specific operations, including wavelet transforms, on input sequences and arrays of numerical data.

It is another object of the invention to provide a modular design for such a system whereby a system may be built using large numbers of identical IC chips and the chips may be composed of large numbers of identical circuits, thereby to substantially reduce the costs of manufacture.

BRIEF DESCRIPTION OF THE DRAWINGS

These and other aspects of the invention will be more fully understood from the following detailed description of the preferred embodiment with reference to the accompanying drawings in which:

FIG. 3 is a block and signal flow diagram of the analyzer-adjunct in accordance with the invention;

FIG. 4 is a block and signal flow diagram of the synthesizer-adjunct in accordance with the invention;

FIGS. 7a and 7b are respectively block representations of the de-interleaver and interleaver components in accordance with the invention;

DESCRIPTION OF THE PREFERRED EMBODIMENTS

Figure 1:
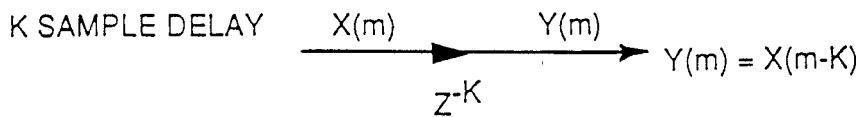
FIG. 1 shows the signal flow graph symbols used in FIGS. 2, 3 and 4.
Figure 1:
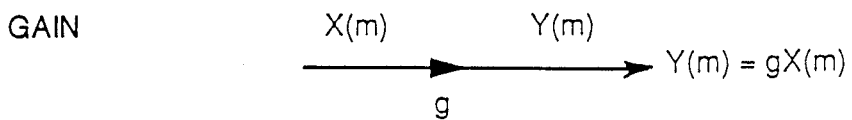
Figure 1:
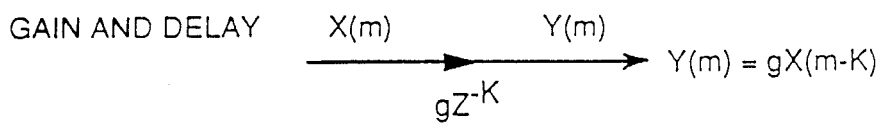
Figure 1:
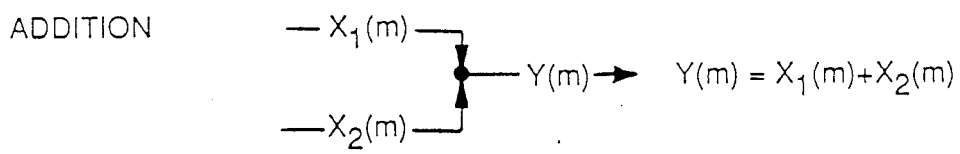
Figure 1:
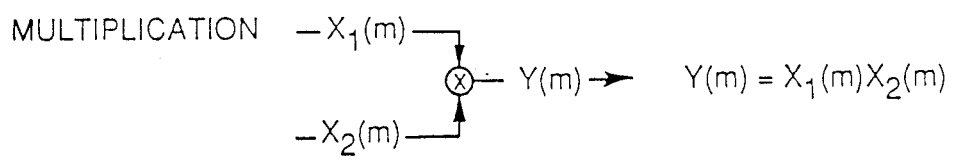
Figure 1:
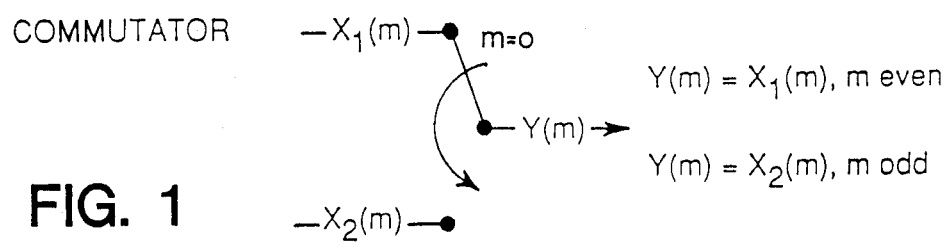
Figure 2:
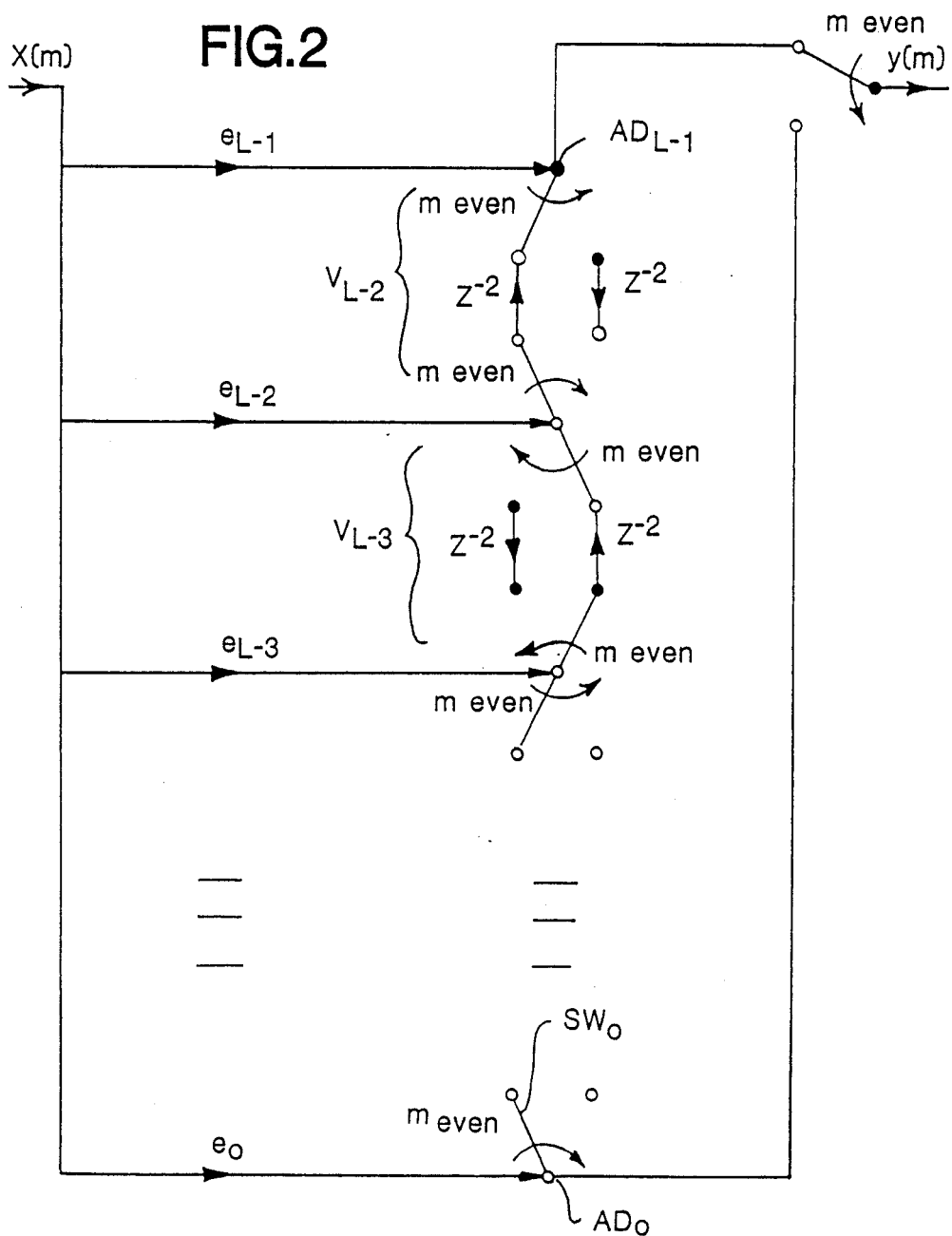
FIG. 2 is a block and signal flow diagram of the dual-convolver in accordance with the invention.

Digital circuit arrangements in accordance with the invention include one or more circuit components to be described below and which are illustrated in FIGS. 2, 3 and 4 below with the aid of certain signal flow graph symbols for a K-sample delay element, a gain and delay element, an adder, a multiplier and a commutator. These symbols are standard among those versed in the art and are illustrated in FIG. 1.

The circuit components illustrated in the figures include what may be called a "dual convolver", an "analyzer adjunct", a "synthesizer adjunct", an "interleaver" and a "de-interleaver".

Referring first to FIG. 2, the dual convolver is a circuit component which operates on an input sequence of digital values X(m) with some given number L of real numerical values $e_0, e_1, \ldots, e_{L-1}$, loaded therein, and outputs an output sequence Y(m) according to the following relation:

$$Y(m) = \sum_{k=0}^{L-1} e_k X(m - 2L + 2 + 2k) \text{ for } m \text{ even} \quad (1)$$

$$Y(m) = \sum_{k=0}^{L-1} e_k X(m - 2k) \text{ for } m \text{ odd}$$

This operation is conveniently performed by two-sample delay elements, gain elements, adders and commutators of the circuit represented by the flow graph shown in FIG. 2. As can be seen from the circuit and the above equations, the output Y of the dual convolver has alternate even and odd components, and they are separated. If the circuit were to be formed on a chip the number of outputs and thus the number of pins would be minimized in relation to a circuit in which the odd and even components were separately output (each output at half the rate). The circuit performs two different convolutions at once and is therefore useful in mirror filtering. Also the circuit minimizes the required number of multiplications and therefore minimizes the required amount of circuitry.

Referring to FIG. 3, the analyzer adjunct is a circuit component which operates on a pair of input sequences of digital values $Y_1(m)$ and $Y_2(m)$, and outputs a single output sequence Y(m) according to the following relation:

$$Y(m) = Y_1(m-2) + Y_2(m-1) \text{ for } m \text{ even}$$

$$Y(m) = -Y_1(m) + Y_2(m-1) \text{ for } m \text{ odd} \quad (2)$$

This operation is conveniently performed by the 1 and 2-sample delay elements, −1 gain element, adder and commutator of the circuit represented by the flow graph shown in FIG. 3.

Referring to FIG. 4, the synthesizer-adjunct is a circuit component which operates on a pair of input sequences of digital values $Z_1(m)$ and $Z_2(m)$, and outputs a single output sequence Z(m) according to the following relation:

$$Z(m) = Z_1(m) + Z_2(m-1) \text{ for } m \text{ even}$$

$$Z(m) = -Z_1(m-2) + Z_2(m-1) \text{ for } m \text{ odd} \quad (3)$$

This operation is conveniently performed by the 1-sample delay element, −1 gain and 1-sample delay element, adder and commutator of the circuit represented by the flow graph shown in FIG. 4.

Figure 5:
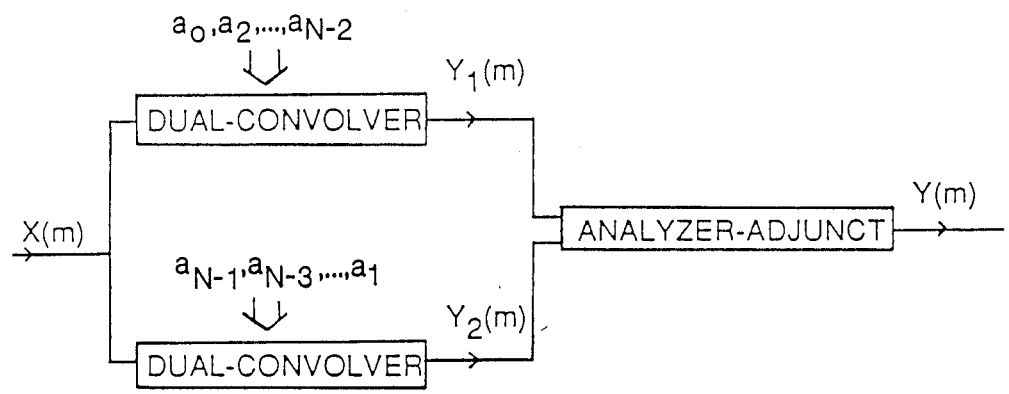
FIG. 5 is a block diagram of a single-stage wavelet analyzer circuit in accordance with the invention.

An input sequence of digital data may be wavelet transformed for analysis with a single stage wavelet analyzer formed of a combination of the two dual convolvers and an analyzer-adjunct, as illustrated in FIG. 5. Ordered real numerical values $a_0, a_2, \ldots, a_{N-2}$ are loaded into the first dual-convolver DC1 and the reverse ordered numerical values $a_{N-1}, a_{N-3}, \ldots, a_1$ are loaded into the second dual-convolver DC2. The input sequence X(m) is input to each of the two dual-convolvers in parallel, and the respective outputs of the dual convolvers $Y_1(m)$ and $Y_2(m)$ are input to the analyzer-adjunct which outputs the wavelet signal Y(n) ready for analysis. The dual convolvers and the analyzer-adjunct operate on their inputs as summarized by the equations (1) and (2), to produced the following results:

$$Y_1(m) = \sum_{k \text{ even}} a_k X(m - N + 2 + k) \text{ for } m \text{ even} \quad (4)$$

$$Y_1(m) = \sum_{k \text{ even}} a_k X(m - k) \text{ for } m \text{ odd}$$

$$Y_2(m) = \sum_{k \text{ odd}} a_k X(m + 1 - k) \text{ for } m \text{ even} \quad (5)$$

$$Y_2(m) = \sum_{k \text{ odd}} a_k X(m - N + 1 + k) \text{ for } m \text{ odd}$$

$$Y(m) = \sum_{k=0}^{N-1} a_k X(m - N + k) \text{ for } m \text{ even} \quad (6)$$

$$Y(m) = \sum_{k=0}^{N-1} a_k (-1)^{k+1} X(m - k) \text{ for } m \text{ odd}$$

Thus, when a given data sequence is input to the wavelet analyzer, two sequences are output, an even part and an odd part which are functions of the input data and the circuit is equivalent to a low pass filter and a high pass filter, each followed by a respective 2:1 downsampler. These are functions performed in a mirror filter, performed here in a more efficient way.

Figure 6:
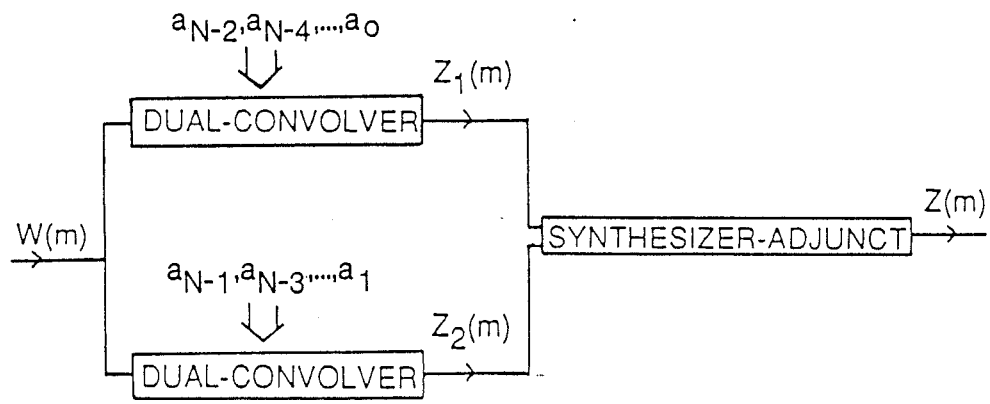
FIG. 6 is a block diagram of a single-stage wavelet synthesizer circuit in accordance with the invention.

It may be demonstrated that if the numerical values $a_0, \ldots, a_{N-1}$, loaded into the dual-convolvers DC1 and DC2 are suitably selected as will be described below, then a single stage wavelet synthesizer formed of a parallel combination of two dual-convolvers DC3 and DC4 and a synthesizer-adjunct as shown in FIG. 6 may be used to reverse the signal decomposition performed by the single-stage wavelet analyzer (with a delay of N). The dual-convolver DC3 of the single stage wavelet synthesizer is loaded with ordered real or complex numerical values $a_{N-2}, a_{N-4}, \ldots, a_0$ and the ordered real or complex numerical values $a_{N-1}, a_{N-3}, \ldots, a_1$ are loaded into the second dual-convolver DC4. The input sequence generally designated W(m) is input to each of the two dual-convolvers DC3 and DC4 in parallel, and the respective outputs of the dual convolvers $Z_1(m)$ and $Z_2(m)$ are input to the synthesizer-adjunct which outputs the wavelet signal Z(m). The dual convolvers and the synthesizer-adjunct operate on their inputs as summarized by the equations (1) and (3), to produced the following results:

$$Z_1(m) = \sum_{k\ even} a_k W(m-k) \text{ for } m \text{ even}$$

$$Z_1(m) = \sum_{k\ even} a_k W(m - N + 2 + k) \text{ for } m \text{ odd}$$

$$Z_2(m) = \sum_{k\ odd} a_k W(m + 1 - k) \text{ for } m \text{ even}$$

$$Z_2(m) = \sum_{k\ odd} a_k W(m - N + 1 + k) \text{ for } m \text{ odd}$$

$$Z(m) = \sum_{k\ even} a_k W(m - k) +$$
$$\sum_{k\ odd} a_k W(m - N + k) \text{ for } m \text{ even}$$

$$Z(m) = -\sum_{k\ even} a_k W(m - N + k) +$$
$$\sum_{k\ odd} a_k W(m - k) \text{ for } m \text{ odd}$$

Thus, the wavelet synthesizer performs a single function which in the case of an input sequence consisting of the odd and even parts output by the wavelet analyzer, is the combination of the even and odd parts, that is, the reversal of the functions performed by the wavelet analyzer, to produce the original signal In other words, whereas the analyzer takes a single sequence and decomposes the same into an even part and an odd part that represent in some sense high and low frequency components, the synthesizer takes such components and recombines them. The two parts are maintained in a single sequence so that the analyzer and the synthesizer each have one input and one output so that with a master clock, all the processing can be kept at a single rate within a circuit and the number of physical connections is minimized.

The simplicity of the analyzer and synthesizer is based on the fact that each performs a complicated function with two identical hardware elements and a trivial element, namely two dual convolvers and an adjunct, and that the hardware of the dual convolvers of the analyzer are identical to the dual convolvers of the synthesizer. Only the numbers or the order thereof, loaded into the various dual convolvers, differ.

Referring to FIG. 7a, the de-interleaver is a circuit component such as a demultiplexer which operates on an input sequence of digital values X(m), and outputs a pair of output sequences E(n) and O(n) according to the following relation $$E(n) = X(2n)$$

$$O(n) = X(2n + 1) \tag{8}$$

Referring to FIG. 7b, the interleaver is a circuit component such as a multiplexer which operates on a pair of input sequences of digital values O(n) and E(n), and outputs a single output sequence W(m) according to the following relation:

$$W(m) = E(m/2) \text{ for } m \text{ even}$$

$$W(m) = O((m-1)/2) \text{ for } m \text{ odd} \tag{9}$$

The above novel interleaver, de-interleaver, analyzer and synthesizer components may be combined to construct a number of useful data processing circuits including (1) wavelet sub-band processors capable of decomposing one-dimensional sequences of numerical data or multi-dimensional arrays of numerical data into constituent wavelets and to synthesize the original sequences or arrays from their constituent wavelets after processing, (2) function generators capable of calculating functions including wavelet functions to within any specified degree of detail, and (3) differential equation integrators for calculating the time evolution of a spatial function defined through a differential equation in conjunction with an initial value.

Figure 8A:
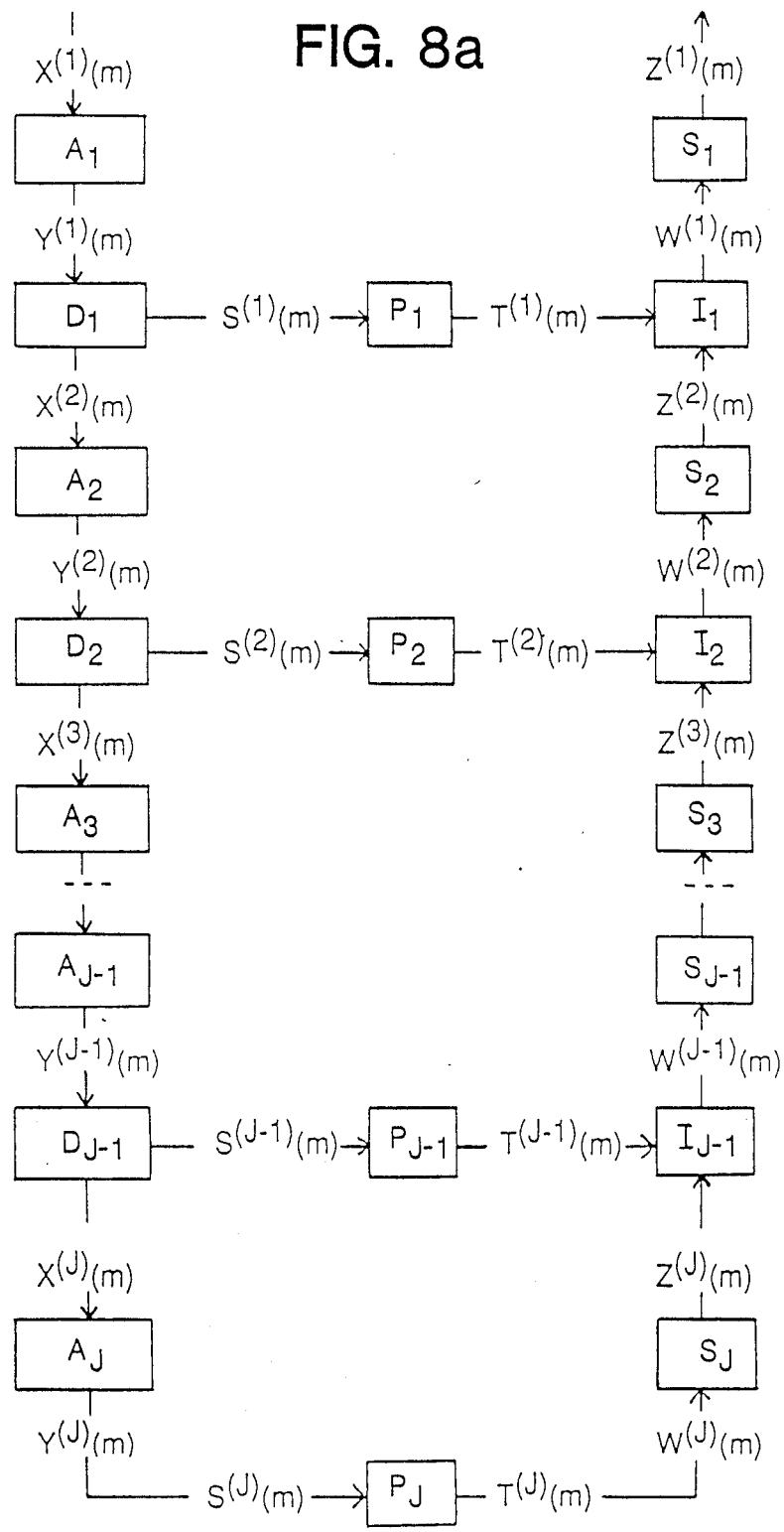
FIGS. 8a and 8b are signal flow diagrams of modular digital signal processing systems which decompose a signal and then synthesize the signal, according to two embodiments of the invention.

Referring to FIG. 8a, there is schematically illustrated a wavelet sub-band processor formed in stages i, i a positive integer 1 to J, in a ladder configuration. Each stage includes in series connection a single stage wavelet analyzer $A_i$ as illustrated in FIG. 5, a de-interleaver, $D_i$, as illustrated in FIG. 7a, an interleaver $I_i$ as illustrated in FIG. 7b and a single stage wavelet synthesizer $S_i$ as illustrated in FIG. 6, except stage J which does not include an interleaver or de-interleaver. Each analyzer $A_i$ receives an input stream of digital data $X^{(i)}(m)$ from a data source in the case of stage i=1 and from one of the outputs of the de-interleaver $D_i$ for stages i≠1, and outputs a data stream $Y^{(i)}(m)$. Each de-interleaver $D_i$, i=1, ..., J−1, receives the corresponding data stream $Y^{(i)}(m)$ and outputs each at half the data rate of the data stream $Y^{(i)}(m)$ a data stream $S^{(i)}(m)$ to be input to a corresponding processor $P_i$, and a data stream $X^{(i+1)}(m)$ to be input to the analyzer $A_{i+1}$ of the next stage. The output $Y^{(J)}(m)$ of the Jth stage is input as data stream $Y^{(i)}(m)$ of the same data rate directly to a corresponding sub-band processor $P_J$. Thus the data rate of each of the successive data streams $S^{(i)}(m)$ is one half that of the data stream $S^{(i-1)}(m)$ of the preceding stage, except for data stream $S^{(J)}(m)$ which has the same data rate as data stream $S^{(J-1)}(m)$, and thus for i=1, ..., J−1, the data rate of $S^{(i)}(m)$ is equal to $2^{-i}$ times the data rate of the input data stream $X^{(1)}(m)$. The relationships between the inputs and outputs of the de-interleavers $D_i$ may thus be expressed:

$$X^{(i)}(m) = Y^{(i-1)}(2m) \text{ for } 2 \leq i \leq J \tag{10}$$

$$S^{(i)}(m) = Y^{(i)}(2m+1) \text{ for } 1 \leq i \leq J-1 \tag{11}$$

$$S^{(J)}(m) = Y^{(J)}(m) \tag{12}$$

Thus, in each stage i, the de-interleaver $D_i$ separates the odd (high frequency) part $S^{(i)}(m)$ and even (low frequency) part $X^{(i)}(m)$ of the respective output $Y^{(i)}(m)$ of that stage's wavelet analyzer $A_i$. The analyzer portion of the wavelet sub-band processor (the left hand portion of the configuration shown in FIG. 8a) therefore removes the higher frequencies first and then successively decreasing frequencies in the data streams $S^{(i)}(m)$, that is, the frequencies of the data streams $S^{(i)}(m)$ decrease (geometrically by a factor of two) with increasing values of i, for i=1, ..., J−1.

The processors $P_i$ may perform any process on the particular data sequence input thereto, for example a frequency analysis for pattern recognition, data compression or data coding, transmission and decoding, or a combination of these. If the data streams are not altered too much, that is, $S^{(i)}(m) \simeq T^{(i)}(m)$, then with appropriate selection of coefficients $a^{(i)}k$ as will be described, the output signals $Z^{(i)}(m)$ will have certain desirable properties as will be explained below.

In each stage $i$, $i=1, \ldots, J-1$, the output data stream $T^{(i)}(m)$ of the sub-band processor $P_i$ is input to the corresponding interleaver $I_i$. Also input to the interleaver $I_i$ is the output data stream $Z^{(i+1)}(m)$ of the single stage wavelet synthesizer $S_{i+1}$ of the next stage $i+1$, and the output data stream $W^{(i)}(m)$ of the stage's interleaver $I_i$ is input to the corresponding single stage wavelet synthesizer $S_i$. The relationships between the inputs and outputs of the interleavers $I_i$ may thus be expressed:

$$W^{(i)}(m) = Z^{(i+1)}(m/2) \text{ for } m \text{ even, for } 1 \leq i \leq J-1 \quad (13)$$
$$W^{(i)}(m) = T^{(i)}((m-1)/2) \text{ for } m \text{ odd, for } 1 \leq i \leq J-1$$
$$W^{(J)}(m) = T^{(J)}(m)$$

The relationships between $X^{(i)}(m)$ and $Y^{(i)}(m)$ and between $Z^{(i)}(m)$ and $W^{(i)}(m)$ are defined by ordered numerical values loaded into the analyzers $A_i$ and the synthesizers $S_i$ and the equations (13) above. The ordered numerical values loaded into each analyzer $A_i$ and each synthesizer $S_i$ may be designated $a^{(i)}k$, $i=1, \ldots, J$, $k=0, \ldots, N_i-1$, where $N_i$ is the number of numerical values loaded into the analyzer $A_i$ and the synthesizer $S_i$ (the numerical values loaded into the analyzer $A_i$ and those loaded into the corresponding synthesizer $S_i$ being the same). These numerical values are selected so that if the processors $P_i$ pass through input signals without significant alteration but with a "delay" of $N_{i+1}+N_{i+2}+ \ldots +N_J$, that is so that $$T^{(i)}(m) \approx S^{(i)}(m-N_{i+1}- \ldots -N_J), \quad (14)$$

then $$Z^{(i)}(m) \approx X^{(i)}(m-N_i-N_{i-1}- \ldots N_1 \text{ for } 1 \leq i \leq J \quad (15)$$

so that the system output $Z^{(1)}(m) \approx X^{(1)}(m-N_1-N_2-, \ldots -N_J)$, that is, the system input "delayed" by $N_1+N_2+ \ldots +N_J$. In the case of stored data $X^{(1)}(m)$, the "delays" may not be time delays but merely indexing delays. The "delays" provided by the processors $P_i$ are necessary to maintain synchronism as a result of the "delays" in the analyzers $A_i$.

That the output is approximately equal to the input delayed, can be shown to be satisfied by selection of $a^{(i)}k$ to perform a wavelet transformation, in particular so that, for each $i$, and for all even integers $j$:

$$\sum_{k=0}^{N_J-j} a^{(i)}_k a^{(i)}_{k+j} = \delta(j) \text{ where } \begin{array}{l} \delta(j) = 1 \text{ for } j = 0 \\ \delta(j) = 0 \text{ for } j \neq 0 \end{array} \quad (16)$$

A sequence of values which satisfy the above equation are hereinafter referred to as "compatible".

This relationship may be better understood from the following proof of the proposition that the equations which define the wavelet transform:

$$Y(m) = \sum_{k=0}^{N-1} a_k X(m - N + k) \text{ for } m \text{ even} \quad (17)$$

$$Y(m) = \sum_{k=0}^{N-1} a_k(-1)^{k+1} X(m - k) \text{ for } m \text{ odd}$$

-continued $$Z(m) = \sum_{\substack{k=0 \\ k \text{ even}}}^{N-2} a_k W(m - k) + \quad (18)$$

$$\sum_{\substack{k=1 \\ k \text{ odd}}}^{N-1} a_k W(m - N + k) \text{ for } m \text{ even}$$

$$Z(m) = - \sum_{\substack{k=0 \\ k \text{ even}}}^{N-2} a_k W(m - N + k) +$$

$$\sum_{\substack{k=1 \\ k \text{ odd}}}^{N-1} a_k W(m - k) \text{ for } m \text{ odd},$$

where $Y$ and $W$ are the same, give $Z(M)=X(m-N)$ for the sequence of real numbers $a_0, a_1 \ldots, a_{N-1}$, if and only if $a_0, a_1, \ldots, a_N$, are compatible, that is, for all even integers $j$, they satisfy the equation $$\sum_{k=0}^{N-j} a_k a_{k+j} = \delta(j) \text{ where } \begin{array}{l} \delta(j) = 1 \text{ for } j = 0 \\ \delta(j) = 0 \text{ for } j \neq 0 \end{array} \quad (19)$$

Assuming that $m$ is even, by using the first, respectively second, equality in equation (17) to express the value for $W$ in the first, respectively second, term on the right in the first equality in equation (18) the following equation is obtained:

$$Z(m) = \sum_{\substack{k=0 \\ k \text{ even}}}^{N-2} a_k \sum_{j=0}^{N-1} a_j X(m - k - N + j) + \quad (20)$$

$$\sum_{\substack{k=1 \\ k \text{ odd}}}^{N-1} a_k \sum_{j=0}^{N-1} a_j(-1)^{j+1} X(m - N + k - j)$$

$$= \sum_{-N+1}^{N-1} d_n X(m - N + n)$$

where the sequence $d_n$ is defined by $$d_n = \sum_{\substack{k=0 \\ k \text{ even}}}^{N-2} a_k a_{k+n} +$$

$$\sum_{\substack{k=1 \\ k \text{ odd}}}^{N-1} (-1)^{k-n+1} a_k a_{k-n} \text{ for } -N+1 \leq n \leq N-1$$

where it is assumed that $a_p=0$ for $p<0$ and $p>N-1$. If $n$ is odd, then the first and second terms above cancel and $d_n=0$. Therefore, the condition that $d_n=\delta(n)$ is equivalent to the condition that $a_0, a_1 \ldots, a_{N-1}$ be a compatible sequence. This proves the theorem for even values of $m$.

If it is assumed that m is odd, then by using the second, respectively first, equality in equation (17) to express the value for W in the first, respectively second, equality in equation (18) the following equation is obtained:

$$Z(m) = -\sum_{\substack{k=0 \\ k\text{ even}}}^{N-2} a_k \sum_{j=0}^{N-1} a_j(-1)^{j+1} X(m - N + k - j) +$$

$$\sum_{\substack{k=1 \\ k\text{ odd}}}^{N-1} a_k \sum_{j=0}^{N-1} a_j X(m - N - k + j)$$

$$= \sum_{-N+1}^{N-1} d_n X(m - N + n)$$

Therefore the theorem is proven.

Important advantages of the arrangement shown in FIG. 8a are obtained where the number of numerical values $N_i$ loaded into the analyzer $A_i$ and the synthesizer $S_i$ is the same for all stages i, i=1 to J. Then, the J wavelet analyzers $A_i$ may all be identical and the J wavelet synthesizers $S_i$ may all be identical, and thus the 4J dual-convolvers thereof may all be identical, differing only in the respective coefficients $a^{(i)}k$ input thereto. This of course substantially reduces manufacturing costs of IC chips of a system with these circuits on the chips, as a result of the economies of scale.

It should also be noted that the analyzer portion of the wavelet sub-band processor shown on the left hand side of FIG. 8a is useful independently of the synthesizer portion shown on the right hand side. For example, the analyzer portion could be used independently for pattern recognition.

It should be additionally noted that although the input data $X^{(1)}(m)$ is referred to as a data stream or sequence, the processing on the respective input data $X^{(1)}(m)$ may be performed for all m entirely in parallel if the data is previously stored.

Figures 1, 8B:
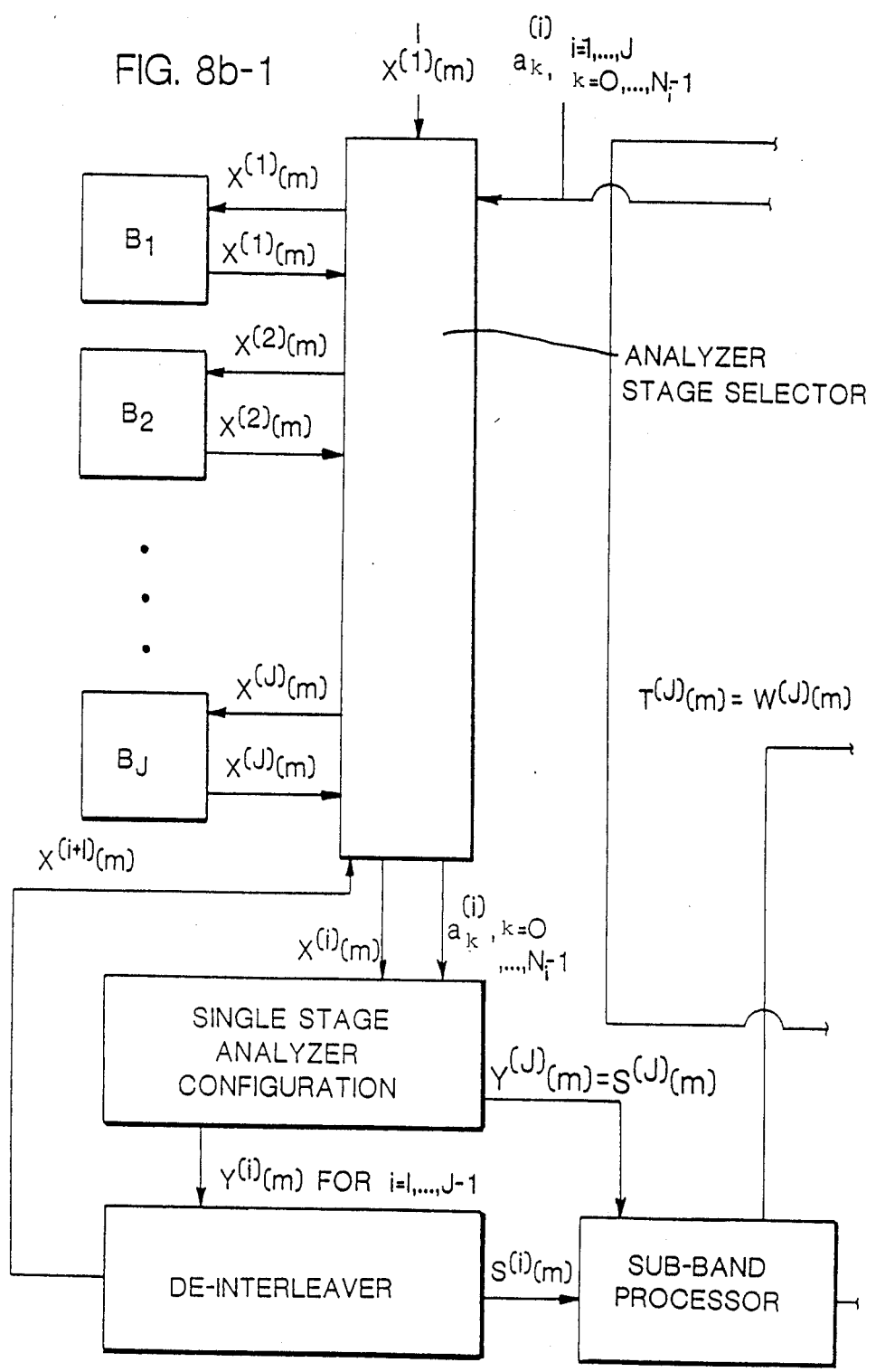
Figures 2, 8B:
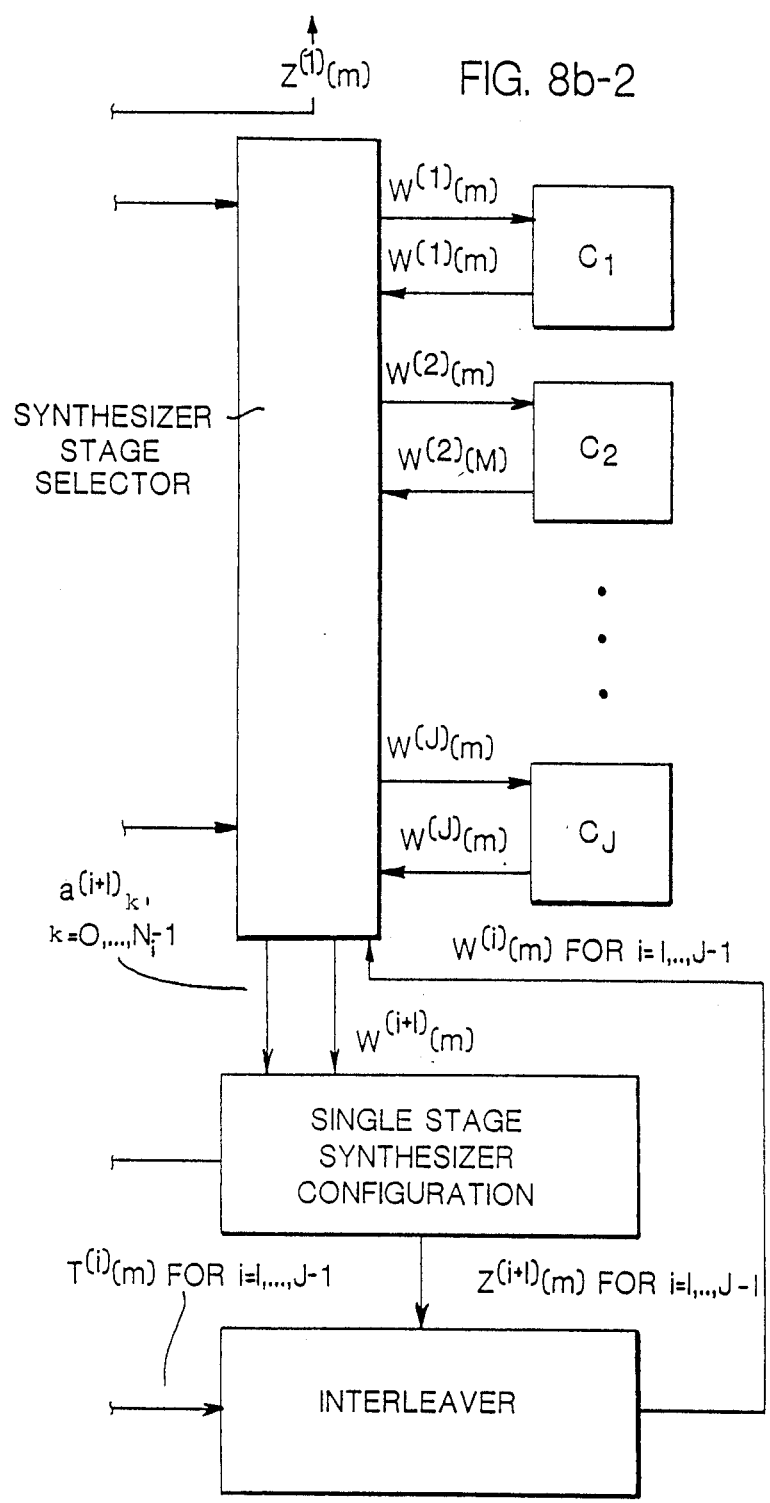

FIG. 8b illustrates an embodiment of the wavelet subband processor illustrated in FIG. 8a and having the identical functionality described by the equations corresponding thereto However, the functionality of the plurality of single stage analyzers denoted by $A_1, \ldots, A_J$ in FIG. 8a is obtained by one single stage analyzer in FIG. 8b by buffering or, equivalently, temporarily storing the inputs $X^1(m), \ldots, X^J(m)$ to $A_1, \ldots, A_J$ respectively in FIG. 8a and then alternately processing the inputs $X^1(m), \ldots, X^J(m)$ to obtain the outputs $Y^1(m), \ldots, Y^J(m)$ by using one single stage wavelet analyzer. Furthermore, the plurality of de-interleavers, denoted by $D_1, \ldots, D_{J-1}$ in FIG. 8a is replaced by a single de-interleaver D in FIG. 8b. Likewise, the functionality of the plurality of single stage wavelet synthesizers, denoted by $S_1, \ldots, S_J$ in FIG. 8a is achieved by one single stage wavelet synthesizer and by one interleaver in FIG. 8b by buffering or, equivalently, temporarily storing the inputs $W^1(m), \ldots, W^J(m)$ to $S_1, \ldots S_J$ respectively in FIG. 8a and then alternately processing the inputs $W^1(m), \ldots, W^J(m)$ to obtain the outputs $Z^1(m), \ldots, Z^J(m)$ by using one single stage wavelet synthesizer. Furthermore, the plurality of interleavers, denoted by $I_1, \ldots, I_{J-1}$ in FIG. 8a is replaced by a single de-interleaver I in FIG. 8b. In an alternate embodiment, two or more, but less than J each of analyzers, synthesizers, de-interleavers and interleavers may be used. In a further simplification of the circuit shown in FIG. 8b, the analyzer circuit and the synthesizer may share a common pair of dual-convolvers, alternatively connectable to an analyzer adjunct and a synthesizer adjunct.

In accordance with another embodiment of the invention, an alternate arrangement of single stage wavelet synthesizers $S_i$ as illustrated in FIG. 6 and interleavers $I_i$ as illustrated in FIG. 7b, is provided for performing calculations of sampled approximations to a function in terms of coefficients of scaling functions and associated wavelets Scaling functions ($\phi(u-k)$) and wavelet functions ($\Psi(u-k)$), are related well known functions which form orthonormal sets (k and j integers). Thus, $$\int \phi(u)du = 1 \qquad (22)$$

$$\int \phi(u-j)\phi(u-k)du = \delta(j-k) \qquad (23)$$

$$\int \Psi(u-j)\Psi(u-k)du = \delta(j-k) \qquad (24)$$

$$\int \Psi(u-j)\phi(u-k)du = 0 \qquad (25)$$

The theory of orthonormal wavelets is described in the following publications: Coifman, R., Meyer, Y. "The discrete wavelet transform," *Preprint*, 1987; Daubechies, I., Grossman, A., Meyer, Y., "Painless nonorthogonal expansions," *J. Math. Phys.*, Vol. 27, p. 1271, 1986; Daubechies, Ingrid, "Orthonormal basis of compactly supported wavelets," *Technical Report*, Room 2C-371, AT&T Bell Laboratories 600 Mountain Avenue, Murray Hill, N.J. 07974, 1987; Goupillaud, P., Grossman, A., Morlet, J., "Cycle-octave and related transforms in seismic signal analysis," *Geoexploration*, Vol. 23, p. 85, 1984; Grossman, A., Morlet, J., Paul, T., "Transforms associated to square-integrable group representations, I: general results," *J. Math. Physics*, Vol. 26, p. 2473, 1985; Grossman, A., Morlet, J., Paul, T., "Transforms associated to square-integrable group representations, II: examples," *Ann. Inst. H. Poincare*, Vol. 45, p. 293, 1986; Grossman, A., Morlet, J., "Decomposition of Hardy functions into square integrable functions of constant shape," *SIAM J. Math. Anal.*, Vol. 15, p. 723, 1984; Grossman, A., Morlet, J., "Decomposition of functions into wavelets of constant shape and related transforms," Center for Interdisciplinary Research and Research Center Bielefeld-Bochum-Stochastics, *University of Bielefeld. Report No. 11*, December 1984 also in *Mathematics and Physics* 2, L. Striet, editor, World Scientific Publishing Co., Singapore, pp. 135-165, 1987; Kronland-Martinet; Mallat 1; Mallat 2; and Meyer, Y., Jaffard, S., Rioul, O., "L'analyse par ondelettes," *Pour la Science*, pp. 28-87, September 1987; and are related to the theory of quadrature mirror filters for sideband signal processing which is described in Crochiere et al.

Figure 9:
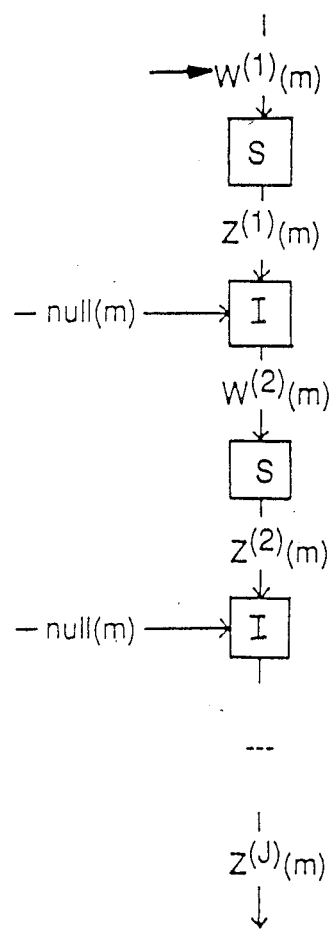
FIG. 9 is a block and signal flow diagram of a modular digital signal processing system which calculates sampled approximations to a signal in terms of its coefficients in terms of scaling functions and associated wavelets, according to another embodiment of the invention.

Referring to FIG. 9, if an input sequence of digital values $W^{(1)}$ is provided to wavelet synthesizer $S_1$, null sequences null (m) consisting of zero values are provided to one of each of the inputs of the interleavers $I_i$ for each of J stages, and the output sequence of the Jth stage, $Z^{(J)}(m)$, may be expressed according to the following equations:

$$Z^{(J)}(m) \approx 2^{-J/2} S(m/2^J - N/2) \qquad (26)$$

where $$S(u) = \sum_n W^{(1)}(2n + N)\phi(u - n) + \sum_n W^{(1)}(2n + 1)\Psi(u - n)$$

where $\phi$ is a scaling function and $\Psi$ is the associated wavelet function. In particular, if $$W^{(1)}(m) = \delta(m) \text{ then } \phi(m/2^J) \cong 2^{J/2} Z^{(J)}(m)$$

and if $$W^{(1)}(m) = \delta(m-1) \text{ then}$$
$$\Psi(m/2^J) \cong 2^{J/2} Z^{(J)}(m + 2^J N/2).$$

The scaling function $\phi(u)$ has the characteristic that for some sequence of real numbers $a_0, \ldots a_k \ldots, a_{N-1}$ which is "compatible" as defined above, the set of real numbers $c_0, \ldots c_k \ldots, c_{N-1}$ where $c_k = \sqrt{2} a_k$, $i = 0, \ldots N-1$, interrelates $\phi(u)$, $\Psi(u)$ and $\phi(2u)$ as follows:

$$\phi(u) = \sum_{k=0}^{N-1} c_k \phi(2u - k) \qquad (27)$$

$$\psi(u) = \sum_{k=0}^{N-1} c_k(-1)^{k+1} \phi(2u - 1 + k) \qquad (28)$$

The collection of functions $\{\Psi_{j,k}(u) = 2^{j/2}\Psi(2^j u - k)\}$ forms an orthonormal basis for $L^2(R)$, that is, the space of square integrable functions on R (the real line).

Therefore, a function which can be expressed or approximated by a linear combination of these orthonormal functions $\phi$ and $\Psi$ as follows $$S(u) = \sum_{n=0}^{K-1} W(2n + N)\phi(u - n) + \sum_{n=0}^{K-1} W(2n + 1)\Psi(u - n) \qquad (29)$$

where W(m) is a sequence of numerical values of finite length, can also be expressed or identically approximated by a linear combination of the scaling function $\phi(2u)$ as follows $$S(u) = \sqrt{2} \sum_m Z(m + N)\phi(2u - m) \qquad (30)$$

where Z(m) is another sequence of numerical values of finite length which is related to the sequence W(m) as follows:

$$\begin{aligned} Z(m + N) &= \sum_{k \text{ even}} a_k W(m + N - k) + \\ &\quad \sum_{k \text{ odd}} a_k W(m + k) \text{ for } m \text{ even} \\ &= \sum_{k \text{ odd}} a_k W(m + N - k) - \\ &\quad \sum_{k \text{ even}} a_k W(m + k) \text{ for } m \text{ odd} \end{aligned} \qquad (31)$$

where $a_k$ is the compatible sequence whose values are those from equations (27) and (28), with $a_k = c_k/\sqrt{2}$.

It will be noted that equation (31) above is identical to equation (18) which defines the output of a single stage wavelet synthesizer having the numerical values $a_k$ loaded thereinto. Therefore, if the numerical values $a_k (= c_k/\sqrt{2})$, defining a scaling function and corresponding wavelet function, are loaded into such a single stage wavelet synthesizer S, and a W(m) representation of a function S(u) as coefficients of the scaling and wavelet functions $\phi(u-n)$ and $\Psi(u-n)$ (see eqn. 29) is input thereto, the output sequence Z(m) will also represent the function S(u) (see eqn. 30), but as the coefficients of a linear combination of the scaling functions $\phi(2u-m)$ only. Thus, the synthesizer of the invention provides a simple and convenient manner of converting from one wavelet representation of a given function to another.

Also, it can be shown mathematically, that if $\phi$ and $\Psi$ are defined as above, if X(m) is a numerical sequence, and if Y(m) is defined in terms of X(m) as in eqn. 17 wherein the numerical values $a_k$ are related to $\phi$ as above, then the function $$S(u) = \sqrt{2} \sum_m X(m)\phi(2u - m) \qquad (32)$$

may be expressed as $$S(u) = \sum_n Y(2n + N)\phi(u - n) + \sum_n Y(2n + 1)\Psi(u - n) \qquad (33)$$

But equation (17) also expresses the relationship between the input sequence and output sequence of a single stage wavelet analyzer as is illustrated in FIG. 5, having the numerical values $a_k$. Therefore, the analyzer provides a means for decomposing or analyzing a signal S(u) which is expressed as a linear combination of the orthonormal set $\{\phi_{p+1,j}(u) = 2^{(p+1)/2}\phi(2^{p+1}u-j)$, p an integer, j any integer$\}$, into a base band component equal to a linear combination of the orthonormal set $\{\phi_{p,j}(u), j$ any integer$\}$, and a sub-band component equal to a linear combination of $\{\Psi_{p,j}(u), j$ any integer$\}$. This means can be applied iteratively to the successive baseband components to express S(u) in terms of wavelet basis functions $\{\Psi_{q,j}(u), j$ any integer and $q \geq p\}$. Furthermore, any continuous function can be expressed as $$S(u) = \lim_{p \to \infty} \sum_j S(j/2^p)\phi(2^p u - j) \qquad (34)$$

and can therefore be approximated with unlimited precision by an analysis as above. Conversely, the above shows that the synthesizer can be used to reconstruct or synthesize a signal from its base-band and sub-band components (inputting their respective component values W(m) to the synthesizer).

In this regard, it is noted that in many applications in which wavelets are used the exact values (a plot) of the wavelets is not known; only the parameters $a_k$ or $c_k$ are known (typically selected to give the functions $\phi$ and or $\Psi$ some desirable properties such as a relation to a physical phenomenon being investigated). Thus, the present invention provides a means by which the wavelet and scaling functions may be plotted (as with a display device) at whatever scale is desired (the larger is J the smaller is the scale).

In this respect equation (27) is noted. This equation shows that while $\phi(u)$ is supported on 0 to N, on the right side of the equation is a summation of functions with $\phi(2u-k)$ as factor, and these factors will of course be supported on an interval half the length of that of $\phi(2u-k)$, that is 0 to N/2. In other words, a graph of $\phi(2u-k)$ would have the same amplitudes but would be narrower by a factor of 2 than that of $\phi(u)$.

The most elementary example of this relationship is given by the Haar scaling function H(u) which is a scaling function equal to 1 from u=0 to 1 and 0 elsewhere. The Jth order Haar scaling function $H(2^Ju)$ is equal to 1 from u=0 to $\frac{1}{2}^J$ and 0 elsewhere and $H(2^Ju-k)$ is equal to 1 from u=k to $k+\frac{1}{2}^J$ and 0 everywhere else. It can be seen that a multitude of various functions can be constructed from a linear combination of Haar functions and in fact, a Haar scaling function of a lower order can be constructed from a linear combination of Haar scaling functions of a higher order.

Thus, wavelets provide a powerful tool which permits physical phenomena such as superconductivity, crystal formation, music, heartbeat patterns, seismic signals and speech to be analyzed at different scales, and the analyzers and synthesizers of the invention provide improved circuitry which facilitates such analysis.

The present invention is also applicable to processing of multi-dimensional data such as the performance of a two-dimensional wavelet analyzer function and a two-dimensional wavelet synthesizer function. These functions are performed with circuit arrangements consisting of one or more sets of two-dimensional single stage wavelet analyzers and synthesizers and two-dimensional interleavers and de-interleavers, as schematically illustrated in FIGS. 10a-10d for plural sets.

Figure 10A:
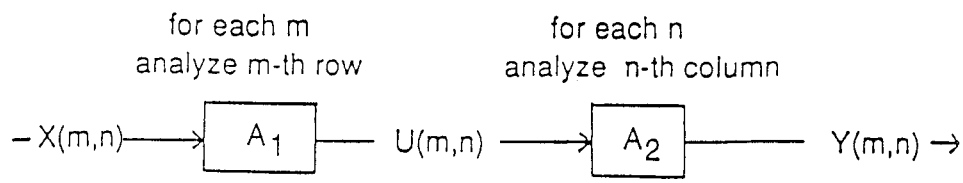
FIGS. 10a, 10b, 10c and 10d are block circuit diagrams respectively of a two-dimensional single stage wavelet analyzer, a two-dimensional single stage wavelet synthesizer, a two-dimensional de-interleaver and a two-dimensional interleaver, according to the invention.

As shown in FIG. 10a, the two-dimensional single stage wavelet analyzer consists of two one-dimensional single stage wavelet analyzers such as is illustrated in FIG. 5, connected in series so that a first one-dimensional single stage wavelet analyzer $A_1$ transforms the rows (for each m, transform mth row) of a two-dimensional array of data X(m,n) and a second one-dimensional single stage wavelet analyzer $A_2$ transforms the columns (for each n, transform nth column) of the intermediate output array U(m,n) of the analyzer $A_1$, to obtain an output array Y(m,n). The relationships between the inputs and outputs of the analyzers $A_1$ and $A_2$ are therefore as follows:

$$U_A(m,n) = \sum_{k=0}^{N-1} \beta_k X(m,n-N+k) \quad \text{for } n \text{ even} \quad (35)$$

$$U_A(m,n) = \sum_{k=0}^{N-1} \beta_k(-1)^{k+1} X(m,n-k) \quad \text{for } n \text{ odd}$$

$$Y(m,n) = \sum_{j=0}^{M-1} \alpha_j U_A(m-M+j,n) \quad \text{for } m \text{ even}$$

$$Y(m,n) = \sum_{j=0}^{M-1} \alpha_j U_A(m-j,n) \quad \text{for } m \text{ odd.}$$

where $\alpha_j$, j=0 to M−1 and $\beta_k$, k=0 to N−1, M and N being positive even integers, are "compatible sequences" as defined above.

As a consequence, the output Y(m,n) of the two-dimensional analyzer as a function of the input X(m,n) is as follows:

$$Y(m,n) = \sum_{j=0}^{M-1} \sum_{k=0}^{N-1} \alpha_j \beta_k X(m-M+j,n-N+k) \quad (36)$$
for m even and n even $$Y(m,n) = \sum_{j=0}^{M-1} \sum_{k=0}^{N-1} \alpha_j \beta_k (-1)^{k+1} X(m-M+j,n-k)$$
for m even and n odd $$Y(m,n) = \sum_{j=0}^{M-1} \sum_{k=0}^{N-1} \alpha_j \beta_k (-1)^{j+1} X(m-j,n-N+k)$$
for m odd and n even $$Y(m,n) = \sum_{j=0}^{M-1} \sum_{k=0}^{N-1} \alpha_j \beta_k (-1)^{j+k} X(m-j,n-k)$$
for m odd and n odd.

Figure 10B:
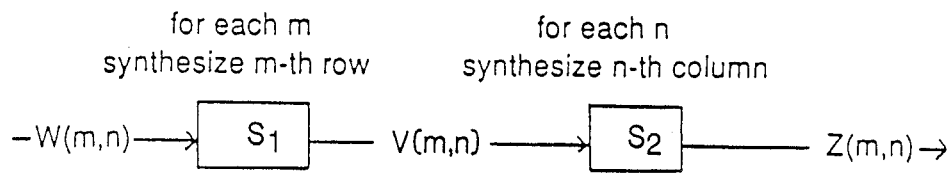

Similarly, as shown in FIG. 10b, the two-dimensional single stage wavelet synthesizer consists of two one-dimensional single stage wavelet synthesizers such as is illustrated in FIG. 6, connected in series so that a first one-dimensional single stage wavelet analyzer $S_1$ transforms the rows (for each m, transform mth row) of a two-dimensional array of data W(m,n) and a second one-dimensional single stage wavelet synthesizer $S_2$ transforms the columns (for each n, transform nth column) of the intermediate output array $V_S(m,n)$ of the synthesizer $S_1$, to obtain an output array Z(m,n). The relationships between the inputs and outputs of the synthesizers $S_1$ and $S_2$ are therefore as follows:

$$V_S(m,n) = \sum_{\substack{k=0 \\ k \text{ even}}}^{N-2} \beta_k W(m,n-k) + \sum_{\substack{k=1 \\ k \text{ odd}}}^{N-1} \beta_k W(m,n-N+k)$$
for n even $$V_S(m,n) = \sum_{\substack{k=0 \\ k \text{ even}}}^{N-2} -\beta_k W(m,n-N+k) + \sum_{\substack{k=1 \\ k \text{ odd}}}^{N-1} \beta_k W(m,n-k)$$
for n odd $$Z(m,n) = \sum_{\substack{j=0 \\ j \text{ even}}}^{M-2} \alpha_j V_S(m-j,n) + \sum_{\substack{j=1 \\ j \text{ odd}}}^{M-1} \alpha_j V_S(m-M+j,n)$$
for m even $$Z(m,n) = \sum_{\substack{j=0 \\ j \text{ even}}}^{M-2} -\alpha_j V_S(m-N+J,n) + \sum_{\substack{j=1 \\ j \text{ odd}}}^{M-1} \alpha_j V_S(m-j,n)$$
for m odd As a consequence, the outputs of two-dimensional synthesizers as a function of its input is as follows:

$$Z(m,n) = \sum_{\substack{j=0 \\ j \text{ even}}}^{M-2} \sum_{\substack{k=0 \\ k \text{ even}}}^{N-2} \alpha_j \beta_k W(m-j,n-k) + \quad (38)$$

$$\sum_{\substack{j=0 \\ j \text{ even}}}^{M-2} \sum_{\substack{k=1 \\ k \text{ odd}}}^{N-1} \alpha_j \beta_k W(m-j,n-N+k) +$$

$$\sum_{\substack{j=1 \\ j \text{ odd}}}^{M-1} \sum_{\substack{k=0 \\ k \text{ even}}}^{N-2} \alpha_j \beta_k W(m-M+j,n-k) +$$

$$\sum_{\substack{j=1 \\ j \text{ odd}}}^{M-1} \sum_{\substack{k=1 \\ k \text{ odd}}}^{N-1} \alpha_j \beta_k W(m-M+j,n-N+k)$$
for m even and n even $$Z(m,n) = \sum_{\substack{j=0 \\ j \text{ even}}}^{M-2} \sum_{\substack{k=0 \\ k \text{ even}}}^{N-2} -\alpha_j \beta_k W(m-j,n-N+k) +$$

-continued $$\sum_{\substack{j=0 \\ j \text{ even} k \text{ odd}}}^{M-2} \sum_{k=1}^{N-1} \alpha_j \beta_k W(m-j, n-k) -$$

$$-\sum_{\substack{j=1 \\ j \text{ odd} k \text{ even}}}^{M-1} \sum_{k=0}^{N-2} \alpha_j \beta_k W(m-M+j, n-N+k) +$$

$$\sum_{\substack{j=1 \\ j \text{ odd} k \text{ odd}}}^{M-1} \sum_{k=1}^{N-1} \alpha_j \beta_k W(m-M+j, n-k)$$

for $m$ even and $n$ odd $$Z(m,n) = \sum_{\substack{j=0 \\ j \text{ even} k \text{ even}}}^{M-2} \sum_{k=0}^{N-2} \alpha_j \beta_k W(m-M+j, n-k) -$$

$$\sum_{\substack{j=0 \\ j \text{ even} k \text{ odd}}}^{M-2} \sum_{k=1}^{N-1} \alpha_j \beta_k W(m-M+j, n-N+k) +$$

$$\sum_{\substack{j=1 \\ j \text{ odd} k \text{ even}}}^{M-1} \sum_{k=0}^{N-2} \alpha_j \beta_k W(m-j, n-k) +$$

$$\sum_{\substack{j=1 \\ j \text{ odd} k \text{ odd}}}^{M-1} \sum_{k=1}^{N-1} \alpha_j \beta_k W(m-j, n-N+k)$$

for $m$ odd and $n$ even $$Z(m,n) = \sum_{\substack{j=0 \\ j \text{ even} k \text{ even}}}^{M-2} \sum_{k=0}^{N-2} \alpha_j \beta_k W(m-M+j, n-N+k) -$$

$$\sum_{\substack{j=0 \\ j \text{ even} k \text{ odd}}}^{M-2} \sum_{k=1}^{N-1} \alpha_j \beta_k W(m-M+j, n-k) -$$

$$\sum_{\substack{j=1 \\ j \text{ odd} k \text{ even}}}^{M-1} \sum_{k=0}^{N-2} \alpha_j \beta_k W(m-j, n-N+k) +$$

$$\sum_{\substack{j=1 \\ j \text{ odd} k \text{ odd}}}^{M-1} \sum_{k=1}^{N-1} \alpha_j \beta_k W(m-j, n-k)$$

for $m$ odd and $n$ odd.

Figure 10C:
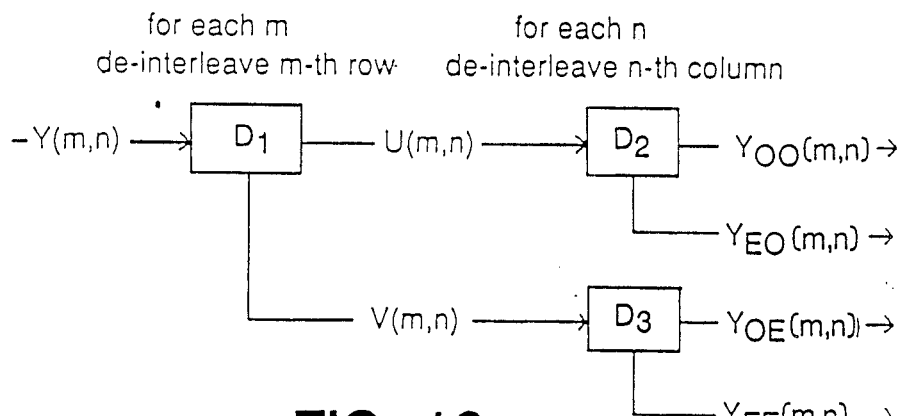

As shown in FIG. 10c, the two-dimensional de-interleaver consists of three one-dimensional de-interleavers such as is illustrated in FIG. 7a, including a first one-dimensional de-interleaver $D_1$ which receives a two-dimensional array of data Y(m,n) and de-interleaves the rows (m=1, ..., J), and second and third de-interleavers $D_2$ and $D_3$ which receive the respective intermediate output arrays of the de-interleaver $D_1$, $U_D(m,n)$ and $V_D(m,n)$ and de-interleave the respective columns (n=1, ..., J), to obtain respective pairs of output arrays $Y_{OO}(m,n)$, $Y_{EO}(m,n)$ and $Y_{OE}(m,n)$, $Y_{EE}(m,n)$.

The relationships between the inputs and outputs of the de-interleavers $D_1$, $D_2$ and $D_3$ are therefore as follows:

$$U_D(m,n) = Y(m, 2n+1) \quad (39)$$

$$Y_{OO}(m,n) = U_D(2m+1, n)$$

$$Y_{EO}(m,n) = U_D(2m, n)$$

$$V_D(m,n) = Y(m, 2n)$$

$$Y_{OE}(m,n) = V_D(2m+1, n)$$

$$Y_{EE}(m,n) = V_D(2m, n).$$

As a consequence the output of the two-dimensional de-interleaver as a function of its input is as follows:

$$Y_{OO}(m,n) = Y(2m+1, 2n+1) \quad (40)$$

$$Y_{EO}(m,n) = Y(2m, 2n+1)$$

$$Y_{OE}(m,n) = Y(2m+1, 2n)$$

$$Y_{EE}(m,n) = Y(2m, 2n).$$

Similarly, but in reverse, the two-dimensional interleaver consists of three one-dimensional interleavers such as is illustrated in FIG. 7b, including a first one-dimensional de-interleaver $I_1$ which outputs a two-dimensional array of data Y(m,n) after interleaving the rows (m=1, ..., J) of two intermediate arrays of data $U_I(m,n)$ and $V_I(m,n)$ respectively output by second and third interleavers $I_2$ and $I_3$ which interleave the respective columns (N=1, ..., J) of respective pairs of input arrays $Y_{OO}(m,n)$, $Y_{EO}(m,n)$ and $Y_{OE}(m\ n)$ $Y_{EE}(m,n)$. The relationships between the inputs and the outputs of the interleavers $I_1$, $I_2$ and $I_3$ are as follows $$U_I(m,n) = Y_{OO}((m-1)/2, n) \quad \text{for } m \text{ odd} \quad (41)$$

$$U_I(m,n) = Y_{EO}(m/2, n) \quad \text{for } m \text{ even}$$

$$V_I(m,n) = Y_{OE}((m-1)/2, n) \quad \text{for } m \text{ odd}$$

$$V_I(m,n) = Y_{EE}(m/2, n) \quad \text{for } m \text{ even}$$

$$Y(m,n) = U_I(m, (n-1)/2) \quad \text{for } n \text{ odd}$$

$$Y(m,n) = V_I(m, n/2) \quad \text{for } n \text{ even}.$$

As a consequence the output of the two-dimensional interleaver as a function of its inputs is as follows:

$$Y(m,n) = Y_{OO}((m-1)/2, (n-1)/2) \quad \text{for } m \text{ odd and } n \text{ odd} \quad (42)$$

$$Y(m,n) = Y_{EO}(m/2, (n-1)/2) \quad \text{for } m \text{ even and } n \text{ odd}$$

$$Y(m,n) = Y_{OE}((m-1)/2, n/2) \quad \text{for } m \text{ odd and } n \text{ even}$$

$$Y(m,n) = Y_{EE}(m/2, n/2) \quad \text{for } m \text{ even and } n \text{ even}.$$

These two-dimensional data processing components may be combined to form a two-dimensional wavelet sub-band processor.

Figure 10D:
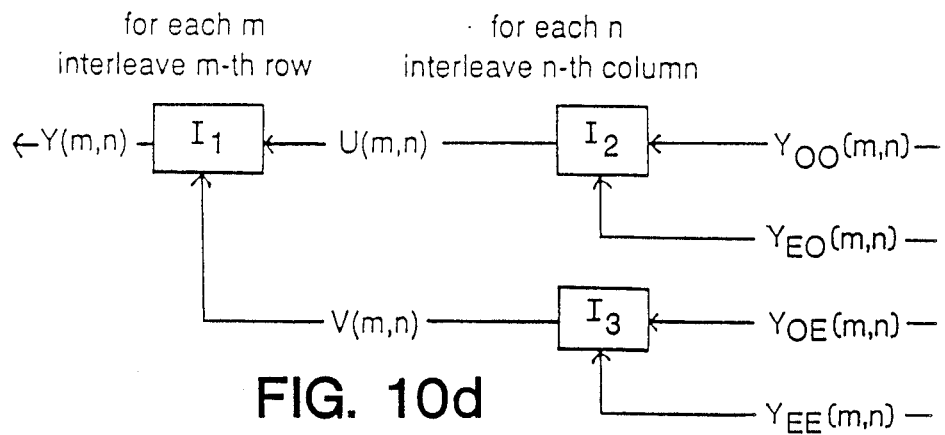
Figure 11A:
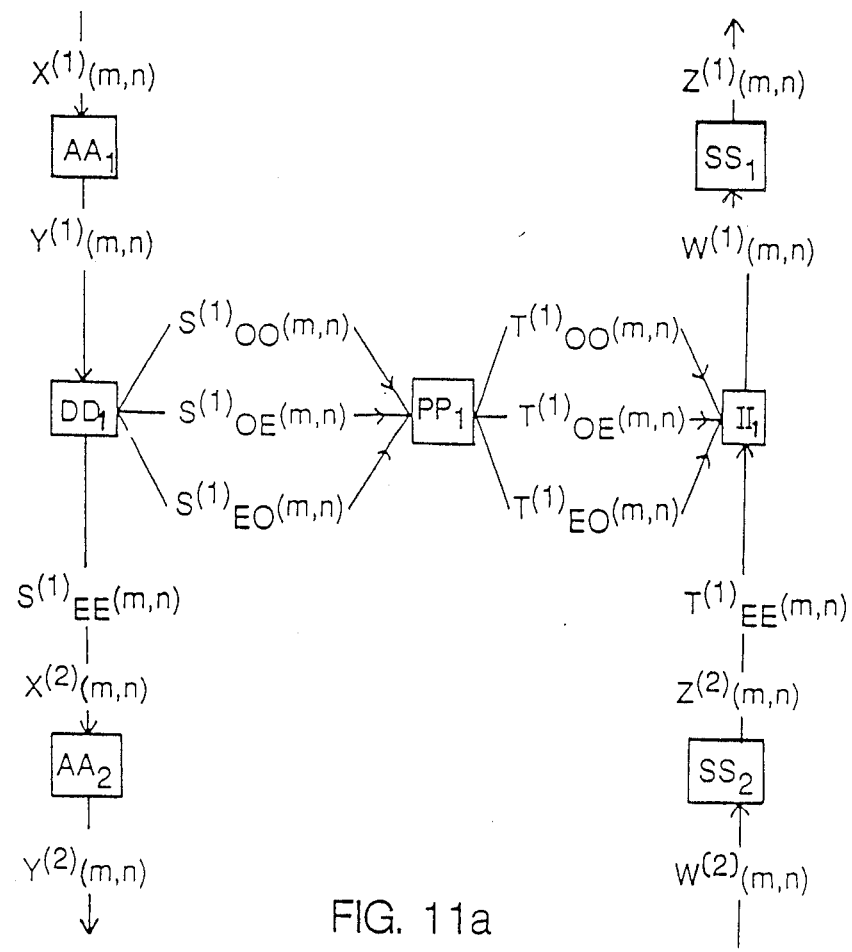
FIGS. 11a and 11b are block signal flow diagrams of wavelet sub-band processors in accordance with two further embodiments of the invention.

Referring to FIG. 11a, there is schematically illustrated a two-dimensional wavelet sub-band processor formed in stages i, i a positive integer 1 to J, in a ladder configuration. Each stage includes in series connection a two-dimensional single stage wavelet analyzer $AA_i$ as illustrated in FIG. 10a, a de-interleaver, $DD_i$ as illustrated in FIG. 10c, an interleaver $II_i$ as illustrated in FIG. 10d and a single stage two-dimensional wavelet synthesizer $SS_i$, except stage J which does not include an interleaver or de-interleaver. Each analyzer $AA_i$ received a two-dimensional input array of digital data $X^{(i)}(m,n)$ from a data source in the case of stage $i=1$ and from one of the outputs of the de-interleaver $DD_i$ for stages $i \geq 1$, and outputs a two-dimensional data array $Y^{(i)}(m,n)$. Each de-interleaver $DD_i$, $i=1, \ldots, J-1$, receives the corresponding data stream $Y^{(i)}(m,n)$ and outputs each at one fourth the data rate of the data array $Y^{(i)}(m,n)$ data arrays $S^{(i)}_{OO}(m,n)$, $S^{(i)}_{OE}(m,n)$, $S^{(i)}_{EO}(m,n)$ to be input to a corresponding processor $P_i$, and a data stream $S^{(i)}_{EE}(m,n)$ as $X^{(i+1)}(m,n)$ to be input to the analyzer $AA_{i+1}$ of the next stage. The output $Y^{(J)}(m,n)$ of the Jth stage is input as data stream $Y^{(i)}(m,n)$ of the same data rate directly to a corresponding processor $P_J$. Thus, the data rate of the successive data arrays $S^{(i)}_{OO}(m,n)$, $S^{(i)}_{OE}(m,n)$, $S^{(i)}_{EO}(m,n)$ are all one quarter of the data rate of the array $S^{(i-1)}_{EE}(m,n)$ of the preceding stage, except for data array $S^{(J)}(m,n)$ which has the same data rate as data array $S^{(J-1)}_{EE}(m,n)$, and thus for $i=1, \ldots, J-1$, the data rate of the array $S^{(i)}(m,n)$ is equal to $2^{-i}$ times the data rate of the input data array $X^{(1)}(m,n)$. The relationships between the inputs and outputs of the de-interleavers $DD_i$ may thus be expressed:

$$X^{(i)}(m,n) = Y^{(i-1)}(2m,2n) \quad \text{for } 2 \leq i \leq J \quad (43)$$

$$S^{(i)}(m) = Y^{(i)}(2m+1, 2n+1) \quad \text{for } 1 \leq i \leq J$$

$$S^{(J)}(m,n) = Y^{(J)}(m,n)$$

In each stage i, $i=1, \ldots, J-1$, the output data arrays $T^{(i)}_{OO}(m,n)$, $T^{(i)}_{EO}(m,n)$ of the sub-band processor $P_i$ are input to the corresponding interleaver $II_i$. Also input to the interleaver $II_i$ is the output data array $Z^{(i+1)}(m)$ as $T^{(i)}_{EE}(m,n)$ of the two-dimensional single stage wavelet synthesizer $SS_{i+1}$ of the next stage $i+1$ and the output data array $W^{(i)}(m,n)$ of the stage's interleaver $II_i$ is input to the corresponding two-dimensional single stage wavelet synthesizer $SS_i$. The relationships between the inputs and outputs of the interleavers $II_i$ may thus be expressed:

$$W^{(i)}(m,n) = Z^{(i+1)}(m/2, n/2) \quad (44)$$
for $m$ odd and $n$ even, for $1 \leq i \leq J-1$ $$W^{(i)}(m,n) = T^{(i)}_{OO}((m-1)/2, (m-1)/2)$$
for $m$ odd and $n$ odd, for $1 \leq i \leq J-1$ $$W^{(i)}(m,n) = T^{(i)}_{OE}((m-1)/2, n/2)$$
for $m$ odd and $n$ even, for $1 \leq i \leq J-1$ $$W^{(i)}(m,n) = T^{(i)}_{EO}(m/2, (n-1)/2)$$
for $m$ even and $n$ odd, for $1 \leq i \leq J-1$ $$W^{(J)}(m,n) = T^{(J)}(m,n)$$

The relationships between $X^{(i)}(m,n)$ and $Y^{(i)}(m,n)$ and between $Z^{(i)}(m,n)$ and $W^{(i)}(m,n)$ are defined by ordered numerical values loaded into the analyzers $AA_i$ and the synthesizers $SS_i$ and the equations (43) and (44) above. The ordered numerical values loaded into each analyzer $AA_i$ and each synthesizer $SS_i$ may be designated $\alpha^{(i)}j$ and $\beta^{(i)}k$, $i=1, \ldots, J$, $j=0$ to $M_i-1$, $k=0, \ldots, N_i-1$, where $M_i$ is the number of rows and $N_i$ the number of columns, of numerical values loaded into the analyzer $AA_i$ and the synthesizer $SS_i$. The numerical values loaded into the analyzer $AA_i$ and those loaded into the corresponding synthesizer $SS_i$ are each compatible, that is, they define wavelet transforms or their inverse and meet the definition defined in equation (19) above, and they are the same compatible sequences or different sequences. These numerical values are selected so that if the processors $P_i$ pass through input signals without significant alteration, that is, $$T^{(i)}_{OO}(m,n) \simeq S^{(i)}_{OO}(m,n), \quad T^{(i)}_{OE}(m,n) \simeq S^{(i)}_{OE}(m,n),$$

$$T^{(i)}_{EO}(m,n) \simeq S^{(i)}_{EO}(m,n) \ldots, \text{for } 1 \leq i \leq J-1$$

and $$W^J(m,n) \simeq Y^J(m,n)$$

then $$Z^{(i)}(m,n) \simeq X^{(i)}(m-N1-\ldots-N_J, n-N_1-\ldots-N_J)$$
for $1 \leq i \leq J$, so that the system output $Z^{(1)}(m,n)$ is the delayed system input.

Figures 2, 11B:
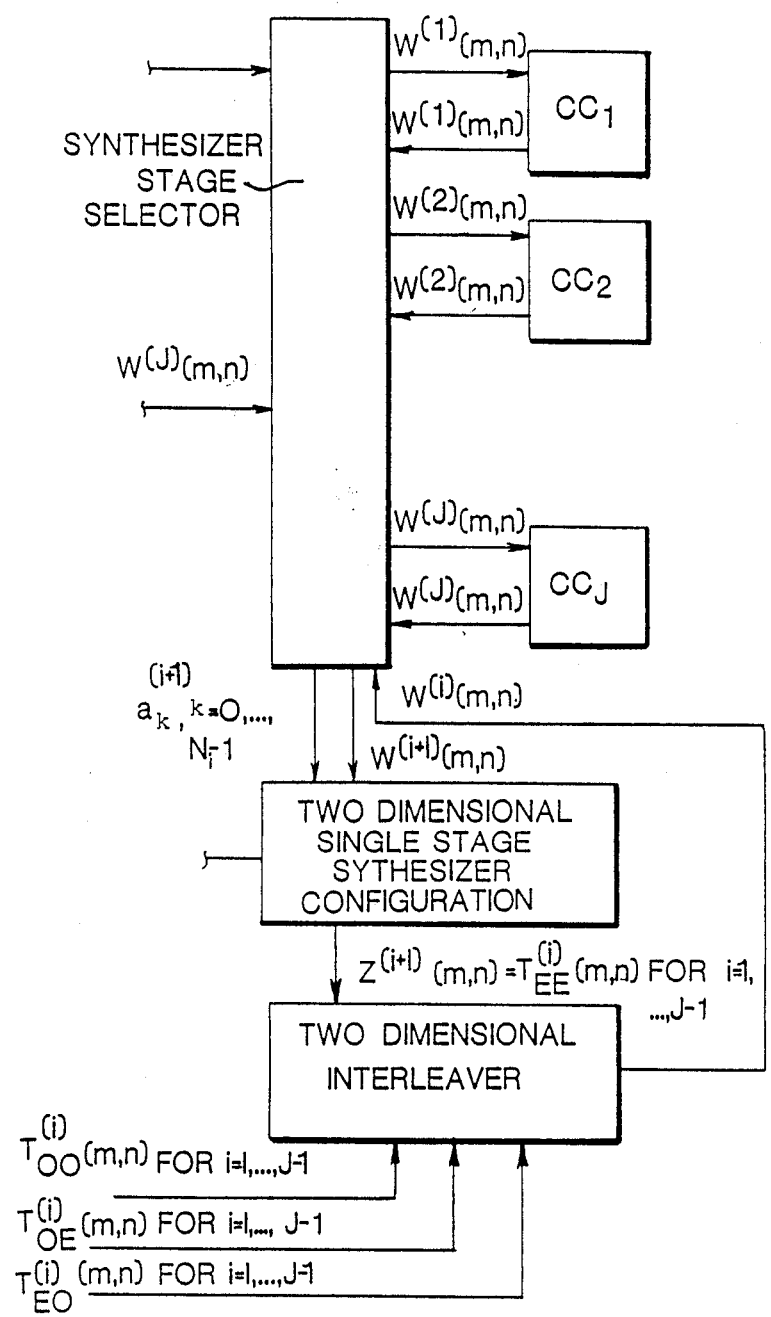

FIG. 11b illustrates an embodiment of the two-dimensional wavelet sub-band processor having the identical functionality of the embodiment of FIG. 11a as defined by the equations relating thereto as described above in which a plurality of two-dimensional single stage wavelet analyzers, two-dimensional single stage wavelet analyzers, two-dimensional de-interleavers and two-dimensional interleavers are used. However, the embodiment of FIG. 11b uses only a single item of each component by buffering data. Moreover, similar alterations and simplifications as are described above with respect to the one-dimensional embodiment would also be possible for the two-dimensional embodiment.

Figure 12:
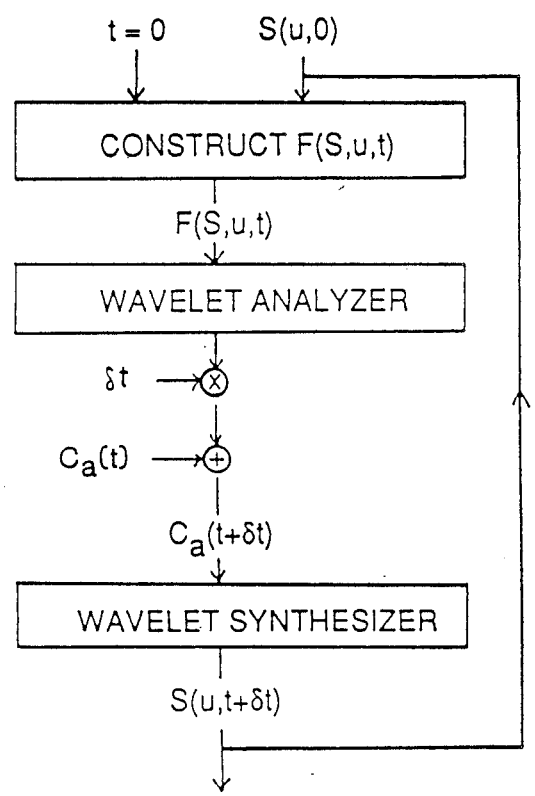
FIG. 12 is a block and signal flow diagram of a differential equations integrator according to still another embodiment of the invention.

In another embodiment of the invention, a combination of a wavelet analyzer, a wavelet synthesizer, an adder, a multiplier and a function construction component are combined to form a differential equations integrator. Such an integrator can be used, for example, to determine a temperature distribution as a function of time t. Referring to FIG. 12, if u is an n dimensional variable and a solution $S(u,t)$ is to be determined, and the time derivative of S is known as a function $F(S,u,t)$ of S, u and t and an initial value $S(u,0)$ of S, is known to be some function $G(u)$, then the value of S at some future time t can be calculated by iteratively computing wavelet coefficients $C_a(t)$ of a wavelet representation of $S(u,t)$. Thus, representing $S(u,t)$ by:

$$S(u,t) = \Sigma C_a(t) X_a(u) \quad (45)$$

where $\{X_a(u)\}$ is an orthonormal wavelet basis for functions from $R^m$ to $R^1$, the initial values of $C_a(t)(C_a(0))$ is given by $$C_a(O) = \int_{R^m} X_a(G(u)) du \quad (46)$$

Iterative calculation of $C_a(t)$ is based on the approximation:

$$C_a(t+\delta t) \simeq C_a(t) + \delta t \int_{R^m} X_a(u) F(S,u,t) du \quad (47)$$

In FIG. 12, the wavelet analyzer computes $\int_{R^m} X_a(u) F(S,u,t) du$. The wavelet analyzer and wavelet synthesizer may be respectively as shown in FIGS. 5 and 6 for m=1 and as shown in FIGS. 10a and 10b for m=2.

The invention now being fully described, it will be apparent to one of ordinary skill in the art that many changes and modifications can be made thereto without departing from the spirit or scope of the invention as set forth herein and the same are intended to be comprehended within the meaning and range of equivalents of the appended claims.

What is claimed is:

1. A dual convolver circuit for convolving a sequence of values X(m) wherein m are successive integers, to obtain an output sequence Y(m) according to the equation $$Y(m) = \sum_{k=0}^{L-1} e_k X(m - 2L + 2 + 2k) \text{ for } m \text{ even}$$

$$Y(m) = \sum_{k=0}^{L-1} e_k X(m - 2k) \text{ for } m \text{ odd,}$$

the circuit comprising:
a plurality of scalar multipliers $e_k$, k=0 to L−1, where L is a positive integer greater than 1, for respectively multiplying each value X(m) by a scalar value $e_k$, each of said scaler multipliers having an output port;
a first adder $AD_0$ having a first input port connected to the output port of the scalar $e_0$, a second input port and first and second output ports;
a plurality of adders $AD_k$, k=1 to L−1, the (k+1)th adder $AD_k$ having a first input port connected to the output port of the scaler multiplier $e_k$, second and third input ports and first and second output ports;
an Lth adder $AD_{L-1}$ having a first input port connected to the output port of the scalar $e_{L-1}$, a second input port and first and second output ports;
a plurality of delay and switch means $V_k$, k=0 to L−3, respectively disposed between the (k+1)th and (k+2)th adders $AD_k$ and $AD_{k+1}$, each delay and switch means $V_k$ including a first two sample delay element $Z_{k1}^{-2}$, a second two sample delay element $Z_{k2}^{-2}$, a first switch $SW_{k1}$ alternately connecting the first output port of the (k+1)th adder $AD_k$ to an input port of the first two sample delay element $Z_{k1}^{-2}$ in a first state of the circuit and the second input port of the (k+1)th adder $AD_k$ to an output port of the second two sample delay element $Z_{k2}^{-2}$ in a second state of the circuit, and a second switch $SW_{k2}$ alternately connecting the third input port of the (k+2)th adder $AD_{k+1}$ to an output port of the first two sample delay element $Z_{k1}^{-2}$ in the first state of the circuit and the second outport port of the (k+2)th adder $AD_{k+1}$ to an input port of the second two sample delay element $Z_{k2}^{-2}$ in the second state of the circuit;
an (L−1)th delay and switch means $V_{L-2}$, disposed between the (L−1)th and Lth adders $AD_{L-2}$ and $AD_{L-1}$, and including a first two sample delay element $Z_{(L-2)1}^{-2}$ and a second two sample delay element $Z_{(L-2)2}^{-2}$, a first switch $SW_{(L-2)1}$ alternately connecting the first output port of the (L−1)th adder $AD_{L-2}$ to an input port of the first two sample delay element $Z_{(L-2)1}^{-2}$ in the first state of the circuit and the second input port of the (L−1)th adder $AD_{L-2}$ to an output port of the second two sample delay element $Z_{(L-2)2}^{-2}$ in the second state of the circuit, and a second switch $SW_{(L-2)2}$ alternately connecting the second input port of the Lth adder $AD_{L-1}$ to an output port of the first two sample delay element $Z_{(L-2)1}^{-2}$ in the first state of the circuit and the second output port of the Lth adder $AD_{L-1}$ to an input port of the second two sample delay element $Z_{(L-2)2}^{-2}$ in the second state of the circuit; and
means for controlling the first and second switches of said delay and switch means $V_k$, k=0 to L−2 to alternate the first and second states of the circuit with successive value X(m) such that the first state corresponds to values X(m) when m is an even integer and the second state corresponds to values X(m) when m is an odd integer the first through (L−1)th adders $AD_k$, k=0 to L−2 providing at the second output port thereof a sum of input values at the first and second input ports thereof when the circuit is in said second state, the first through (L−1)th adders $AD_k$, k=0 to L−2 providing at the second output port thereof a sum of input values at the first and second input ports thereof when the circuit is in said second state, the Lth adder $AD_{L-1}$ providing at the second output port thereof the value at the first input port thereof when the circuit is in said second state, the second through (L−1)th adders $AD_k$, k=1 to L−2 providing at the first output port thereof a sum of input values at the first and third input ports thereof when the circuit is in said first state, the Lth adder $AD_L$, providing at the first output port thereof a sum of input values at the first and second input ports thereof when the circuit is in said first state, the first adder $AD_0$ providing at the first output port thereof the value at the first input port thereof when the circuit is in said first state.

2. A dual convolver circuit as in claim 1, further comprising an output switch having an output port and means for alternately connecting said second output port of said first adder $AD_0$ and second output port of said Lth adder $AD_{L-1}$ to said output port of said output switch respectively during said first state and said second state of the circuit.

3. A signal processor for processing a sequence of input values $X^{(1)}(m)$ wherein m are successive integers, comprising:
an analyzer means having a sequence input port and a sequence output port; and
a de-interleaver means having an input port and first and second output ports,
a first de-interleaver connecting means for connecting the input port of the de-interleaver means to the output port of the analyzer means; and
a second de-interleaver connecting means for connecting the first output port of the de-interleaver means to the input port of the analyzer means;
said analyzer means comprising means, responsive to the sequence of input values $X^{(1)}(m)$ and sequences of input values $X^{(i)}(m)$ for i=2 to J, J a positive integer greater than one, wherein m are successive integers, at its input port for outputting at its output port sequences of output values $Y^{(i)}(m)$ for i=1 to J, given by $$Y^{(i)}(m) = \sum_{k=0}^{N_i-1} a_k X^{(i)}(m - N + k) \text{ for } m \text{ even}$$

-continued $$Y^{(i)}(m) = \sum_{k=0}^{N_i-1} a_k(-1)^{k+1} X^{(i)}(m - k) \text{ for } m \text{ odd,}$$

where $N_i$ for $i=1$ to $J$ are even positive integers, and $k$, $i=1$ to $J$, $k=0$ to $N_i-1$, are numerical constants which, for each $i$, satisfy for all even integers $j$ the equation $$\sum_{k=0}^{N_i-j} a_k a_{k+j} = \delta(j) \text{ where } \begin{array}{l} \delta(j) = 1 \text{ for } j = 0 \\ \delta(j) = 0 \text{ for } j \neq 0, \end{array}$$

said de-interleaver means having means, responsive to the sequence of values $Y^{(i)}(m)$, $i=1$ to $J-1$, at its input port, for outputting at the first output port a sequence of values $X^{(i+1)}(m)$ equal to $Y^{(i)}(2m)$ and for outputting at the second output port a sequence of values $S^{(i)}(m)$ equal to $Y^{(i)}(2m+1)$.

4. A signal processor as in claim 3, wherein said second de-interleaver connecting means includes:
a plurality, $J$ in number, of buffer means $B_i$, where $i=1$ to $J$, each having an input port and an output port, for storing the respective sequence of values $X^{(i)}(m)$;
an analyzer buffer selector means for selectively connecting the output ports of the buffer means $B_i$, $i=1$ to $J$, respectively to the input port of the analyzer means and for selectively connecting the input ports of the buffer means $B_i$, for $i=2$ to $J$ to the output port of the de-interleaver means; and
means for providing the sequence $X^{(1)}(m)$ to the input port of the buffer means $B_1$.

5. A signal processor as in claim 4, wherein said analyzer means has a parameter input port and is further responsive to the numeral values $a^{(i)}_k$ at the parameter input port, for outputting the sequence of output values $Y^{(i)}(m)$ at the sequence output port.

6. A signal processor as in claim 3, wherein the numerical values $a^{(i)}_k$ and integers $N_i$ are respectively equal to a same even integer $N$ and a same value $a_k$ for all $i$, $i=1$ to $J$.

7. A signal processor as in claim 3, further comprising processing means, having an input port coupled to the output ports of said analyzer means and said de-interleaver means, for processing the sequences $S^{(i)}(m)$ and outputting at an output port the output sequences $T^{(i)}(m)$, for each $i$, $i=1$ to $J$ and where $S^{(J)}(m)$ is given by $Y^{(J)}(m)$.

8. A signal processor as in claim 7, further comprising:
a synthesizer means having an input port and an output port;
an interleaver means, having an output port and first and second input ports;
means for connecting the output port of the interleaver means to the input port of the synthesizer means; and
means for connecting the first input port of the interleaver means to the output port of the synthesizer means, and means for connecting the second input port of the interleaver to the output port of the processing means;
the synthesizer means including means, responsive to a sequence of input values $W^{(i)}(m,n)$ at its input port for each $i$, $i=1$ to $J$, wherein $m$ represents successive integers, for generating and outputting at its output port a sequence of output values $Z^{(i)}(m)$ given by $$Z^{(i)}(m) = \sum_{\substack{k=0 \\ k \text{ even}}}^{N_i-2} a^{(i)}_k W^{(i)}(m - k) + \sum_{\substack{k=1 \\ k \text{ odd}}}^{N_i-1} a^{(i)}_k W^{(i)}(m - N_i + k) \text{ for } m \text{ even}$$

$$Z^{(i)}(m) = -\sum_{\substack{k=0 \\ k \text{ even}}}^{N_i-2} a^{(i)}_k W^{(i)}(m - N_i + k) + \sum_{\substack{k=1 \\ k \text{ odd}}}^{N_i-1} a^{(i)}_k W^{(i)}(m - k) \text{ for } m \text{ odd;}$$

the interleaver means being responsive to the sequence $T^{(i)}(m)$ at its second input port and to the sequence $Z^{(i+1)}(m)$ at its first input port for $i=1$ to $J-1$, for outputting at the output port the sequence of values $W^{(i)}(m)$, being equal to $Z^{(i+1)}(m/2)$ for $m$ even and equal to $T^{(i)}((m-1)/2)$ for $m$ odd;
the output port of the processing means being connected to input port of the synthesizer means so that the sequence $W^{(J)}(m)$ input to the input port of the synthesizer $S_J$ is an output sequence $T^{(J)}(m)$ of the processing means, whereby if the effect of the processing means is such that the sequences $T^{(i)}(m)$ are respectively approximately equal to the sequences $S^{(i)}(m)$, then the sequences $Z^{(i)}(m)$ will be approximately equal to the respective sequences $$X^{(i)}\left(m - \sum_{t=i}^{J} N_t\right).$$

9. A signal processor as in claim 8, wherein said second interleaver connecting means includes:
a plurality, $J$ in number, of buffer means $C_i$, where $i=1$ to $J$, each having an input port and an output port, for storing the respective sequence of values $W^{(i)}(m)$;
a synthesizer buffer selector means for selectively connecting the output ports of the buffer means $C_i$, $i=1$ to $J$, to the input port of the synthesizer means and for connecting input ports of the buffer means $C_i$, for $i=1$ to $J-1$, to the output port of the interleaver means; and
means for providing the sequences $T^{(J)}(m)$ from the output port of the processor means to the input port of the buffer means $C_J$.

10. A signal processor as in claim 3, wherein said analyzer means
for processing a sequence of input values $X^{(1)}(m)$ wherein $m$ are successive integers, comprising a plurality, $J$ in number, of successive analyzer circuits $A_i$, where $i=1$ to $J$, each having an input port and an output port; and said de-interleaver means includes:
$J-1$ de-interleaver circuits $D_i$, where $i=1$ to $J-1$, each having an input port and first and second output ports, for all $i$, $i=1$ to $J-1$, the input port of the de-interleaver $D_i$ being connected to the output port of the analyzer circuit $A_i$ and the first output port of the de-interleaver $D_i$ is connected to the input port of the analyzer circuit $A_{i+1}$;

each analyzer circuit $A_i$ comprising means, responsive to the sequence of input values $X^{(i)}(m)$ for outputting at its output port the sequence of output values $Y^{(i)}(m)$ given by $$Y^{(i)}(m) = \sum_{k=0}^{N_i-1} a^{(i)}_k X^{(i)}(m - N_i + k) \text{ for } m \text{ even}$$

$$Y^{(i)}(m) = \sum_{k=0}^{N_i-1} a^{(i)}_k (-1)^{k+1} X^{(i)}(m - k) \text{ for } m \text{ odd},$$

where $N_i$ is an even positive integer and $a^{(i)}_k$, $k=1$ to $N_i$, are numerical constants which, for each i, satisfy for all even integers j the equation $$\sum_{k=0}^{N_J-j} a^{(i)}_k a^{(i)}_{k+j} = \delta(j) \text{ where } \begin{array}{l} \delta(j) = 1 \text{ for } j = 0 \\ \delta(j) = 0 \text{ for } j \neq 0; \end{array}$$

each de-interleaver circuit $D_i$ having means, responsive to the sequence of values $Y^{(i)}(m)$, for outputting at the first output port the sequence of values $X^{(i+1)}(m)$ and for outputting at the second output port the sequence of values $S^{(i)}(m)$.

11. A signal processor as in claim 10, wherein $N_i=N$ for all i, i=1 to J and N is an even positive integer.

12. A signal processor as in claim 10, further comprising a plurality of processing means $P_i$, J in number, for each value of i, said processing means $P_i$ being coupled to the output port of the de-interleaver $D_i$ for i=1 to J−1 and to the output port of the analyzer circuit $A_J$, for processing the sequences $S^{(i)}(m)$ and outputting at an output port the output sequences $T^{(i)}(m)$.

13. A signal processor as in claim 12, wherein $N_i=N$ for all i, i=1 to J and N is an even positive integer.

14. A signal processor as in claim 12, further comprising a plurality, J in number, of successive synthesizer circuits $S_i$, where i=1 to J, each having an input port and an output port; and J−1 interleaver circuits $I_i$, where i=1 to J−1, each having an output port and first and second input ports, for all i, i=1 to J−1, the output port of the interleaver circuits $I_i$ is connected to the input port of the synthesizer circuits $SS_i$, the first input port of the interleaver circuit $I_i$ is connected to the output port of the synthesizer circuit $S_{i+1}$, and the second input port of the interleaver $I_i$ is connected to the output port of the processing means $P_i$;

each synthesizer circuits $SS_i$ comprising means, responsive to a sequence of input values $W^{(i)}(m)$ at its input port wherein m represents success integers, for generating and outputting at its output port a sequence of output values $Z^{(i)}(m)$ given by $$Z^{(i)}(m) = \sum_{\substack{k=0 \\ k \text{ even}}}^{N_i-2} a^{(i)}_k W^{(i)}(m - k) + \sum_{\substack{k=1 \\ k \text{ odd}}}^{N_i-1} a^{(i)}_k W^{(i)}(m - N_i + k) \text{ for } m \text{ even}$$

$$Z^{(i)}(m) = - \sum_{\substack{k=0 \\ k \text{ even}}}^{N_i-2} a^{(i)}_k W^{(i)}(m - N_i + k) + \sum_{\substack{k=0 \\ k \text{ odd}}}^{N_i-1} a^{(i)}_k W^{(i)}(m - k) \text{ for } m \text{ odd};$$

each interleaver circuit $I_i$ having means responsive to the sequences $T^{(i)}(m)$ and $Z^{(i)}(m)$, for outputting at the output port the sequence of values $W^{(i)}(m)$, being equal to $Z^{(i+1)}(m/2)$ for m even and equal to $T^{(i)}((m-1)/2)$ for m odd, the output port of the processing means $P_J$ being connected to input port of the synthesizer circuit $S_J$ so that the sequence $W^{(J)}(m)$ input to the input port of the synthesizer $S_J$ is the output sequence of the processing means $P_J$, whereby if the effect of the processing means $P_i$, i=1 to J is such that the sequences $T^{(i)}(m)$ are respectively approximately equal to the sequences $S^{(i)}(m)$, then the sequences $Z^{(i)}(m)$ are approximately equal to the respective sequences $$X^{(i)}\left(m - \sum_{t=i}^{J} N_t\right).$$

15. A signal processor as in claim 14, wherein $N_i=N$ for all i, i=1 to J and N is an even positive integer.

16. A signal processor for processing an ordered array of input values $X^{(1)}(m,n)$ wherein m and n each represent successive integers, comprising:

an analyzer means having an array input port and first and second array output ports; and a de-interleaver means having an input port and first and second output ports, a first de-interleaver connecting means for connecting the input port of the de-interleaver means to the first array output port of the analyzer means;

a second de-interleaver connecting means for connecting the first output port of the de-interleaver means to the array input port of the analyzer means;

said analyzer means comprising means, responsive to an array of input values $X^{(1)}(m,n)$ at its array input port for all i=1 to J, J a positive integer greater than one, wherein m are successive integers, for outputting at its first array output port for i=1 to J−1 and at its second array output port for i=J an array of output values $Y^{(i)}(m,n)$ given by $$Y^{(i)}(m,n) = \sum_{j=0}^{M_i-1} \sum_{k=0}^{N_i-1} \alpha^{(i)}_j \beta^{(i)}_k X^{(i)}(m - M_i + j, n - N_i + k)$$
for *m* even and *n* even $$Y^{(i)}(m,n) = \sum_{j=0}^{M_i-1} \sum_{k=0}^{N_i-1} \alpha^{(i)}_j \beta^{(i)}_k (-1)^{k+1} X^{(i)}(m - M_i + j, n - k)$$
for *m* even and *n* odd $$Y^{(i)}(m,n) = \sum_{j=0}^{M_i-1} \sum_{k=0}^{N_i-1} \alpha^{(i)}_j \beta^{(i)}_k (-1)^{j+1} X^{(i)}(m - j, n - N_i + k)$$
for *m* odd and *n* odd $$Y^{(i)}(m,n) = \sum_{j=0}^{M_i-1} \sum_{k=0}^{N_i-1} \alpha^{(i)}_j \beta^{(i)}_k (-1)^{j+k} X^{(i)}(m - j, n - k)$$
for *m* odd and *n* odd where $M_i$ and $N_i$, i=1 to J, are even positive integers, and $\alpha_j$, j=0 to $M_i-1$ and $\beta_k$, k=0 to N−1, are numerical constants which, for each i, satisfy for all even integers s and t the equations $$\sum_{j=0}^{M_i-s} \alpha^{(i)}_j \alpha^{(i)}_{j+s} = \delta(s) \text{ where } \begin{array}{l} \delta(s) = 1 \text{ for } s = 0 \\ \delta(s) = 0 \text{ for } s \neq 0, \end{array}$$

$$\sum_{k=0}^{N_i-t} \beta^{(i)}_k \beta^{(i)}_{k+t} = \delta(t) \text{ where } \begin{array}{l} \delta(t) = 1 \text{ for } t = 0 \\ \delta(t) = 0 \text{ for } t \neq 0, \end{array}$$

said de-interleaver means having means, responsive to the array of values $Y^{(i)}(m,n)$, $i=1$ to $J-1$, at its input port, for outputting at the first output port the array of values $X^{(i+1)}(m,n)$ equal to $Y^{(i)}(2m,2n)$ and for outputting at the second output port arrays of values $S^{(i)}_{OO}(m, n)$, equal to $Y^{(i)}(2m+1,2n+1)$, (m,n) equal to $Y^{(i)}(2m+1,2n)$, and $S^{(i)}_{EO}(m,n)$ equal to $Y^{(i)}(2m,2n+1)$.

17. A signal processor as in claim 16, wherein said second de-interleaver connecting means includes
a plurality, J in number, of buffer means $B_i$, where $i=1$ to J, each having an input port and an output port, for storing the respective array of values $X^{(i)}(m,n)$;
an analyzer buffer selector means for selectively connecting the output ports of the buffer means $B_i$, $i=1$ to J, respectively to the array input port of the analyzer means and for selectively connecting the input ports of the buffer means $B_i$, for $i=2$ to J to the first output port of the de-interleaver means, and
means for providing the array $X^{(1)}(m,n)$ to the input port of the buffer means $B_1$.

18. A signal processor as in claim 16, wherein said analyzer means has a parameter input port and is further responsive to application of the numerical constants $\alpha^{(i)}_j$ and $\beta^{(i)}_k$ at the parameter input port for outputting the array of output values $Y^{(i)}(m,n)$ at its array output port.

19. A signal processor as in claim 16, wherein said analyzing means comprises a first dimension analyzer and a second dimension analyzer, said first dimension analyzer having an output port and an input port and means, responsive to the array $X^{(i)}(m,n)$ for each i, $i=1$ to J, at its input port, for generating and outputting at its output port for $i=1$ to J, an array of output values $U_A^{(i)}(m,n)$ given by $$U^{(i)}_A(m,n) = \sum_{k=0}^{N_i-1} \beta^{(i)}_k X^{(i)}(m, n - N_i + k) \text{ for } n \text{ even}$$

$$U^{(i)}_A(m,n) = \sum_{k=0}^{N_i-1} \beta^{(i)}_k (-1)^{k+1} X^{(i)}(m, n - k) \text{ for } n \text{ odd}$$

said second dimension analyzer having an output port, an input port connected to the output port of the first dimension analyzer and having means, responsive to the array of values $U^{(i)}_A(m,n)$ for each i, $i=1$ to J, at its input port for generating and outputting at its output port for $i=1$ to J the array of output values $Y^{(i)}(m,n)$ given by $$Y^{(i)}(m,n) = \sum_{j=0}^{M_i-1} \alpha^{(i)}_j U^{(i)}_A(m - M_i + j, n) \text{ for } m \text{ even}$$

-continued $$Y^{(i)}(m,n) = \sum_{j=0}^{M_i-1} \alpha^{(i)}_j U^{(i)}_A(m - j, n) \text{ for } m \text{ odd}.$$

20. A signal processor as in claim 16, wherein said de-interleaver means comprises first, second and third de-interleaving means, said first de-interleaving means having an input port and first and second output ports, and means, responsive to the array of values $Y^{(i)}(m,n)$ for $i=1$ to $J-1$ at its input port, for generating and outputting at its first and second output ports respectively the arrays of values $U^{(i)}_D = Y^{(i)}(m,2n+1)$ and $V^{(i)}_D = Y^{(i)}(m,2n)$, said second de-interleaving means having an input connected to the first output of said first de-interleaving means, first and second output ports, and means, responsive to the array of values $U^{(i)}_D(m,n)$ at its input port, for generating and outputting at its first and second output ports, respectively, the arrays of values $S^{(i)}_{OO}(m,n) = U^{(i)}_D(2m+1,n)$ at its first output port and the array of values $S^{(i)}_{EO}(m,n) = U^{(i)}_D(2m,n)$ at its second output port, and said third de-interleaving means having an input port connected to the second output port of said first de-interleaving means, first and second output ports, and means, responsive to the array of values $V^{(i)}_D(m,n)$ at its input port, for generating and outputting at its first and second output ports, respectively, the array of values $S^{(i)}_{OE}(m,n) = V^{(i)}_D(2m+1,n)$ at its first output port and the array of values $X^{(i+1)}(m,n) = V^{(i)}_D(2m,n)$ at its second output port.

21. A signal processor as in claim 16, wherein for all i, $i=1$ to J, $N_i$ is equal to a same even positive integer.

22. A signal processor as in claim 16, further comprising processing means, having an input port coupled to the output ports of said analyzer means and said de-interleaver means, for processing the arrays $S^{(i)}_{OO}(m,n)$ and outputting at a first output port, output arrays $T^{(i)}_{OO}(m,n)$ $T^{(i)}_{OE}(m,n)$ and $T^{(i)}_{EO}(m,n)$, for each i, $i=1$ to J, and for processing the array $Y^{(J)}(m,n)$ and outputting at a second output port the output array $W^{(J)}(m,n)$.

23. A signal processor as in claim 22, further comprising:
a synthesizer means having an array input port, a parameter input port and first and second output ports;
an interleaver means, having an output port and first and second input ports;
means for connecting the output port of the interleaver means to the array input port of the synthesizer means; and
means for connecting the first input port of the interleaver means to the first output port of the synthesizer means, means for connecting the second output port of said processing means to the array input port of said synthesizer means, and means for connecting the second input port of the interleaver to the first output port of the processing means;
the synthesizer means including means, responsive to an array of input values $W^{(i)}(m,n)$ at its array input port for each i, $i=1$ to J, wherein m and n represent respective sequences of successive integers, for generating and outputting at its first output port an array for $i=1$, to $J-1$ and at its second output port for $i=0$ of output values $Z^{(i)}(m,n)$ given by T,
the interleaver means being responsive to the arrays $T^{(i)}_{OO}(m,n)$, $T^{(i)}_{OE}(m,n)$ and $T^{(i)}_{EO}(m,n)$ at its second input port and to the array $Z^{(i+1)}(m,n)$ at its first input port for $i=1$ to $J-1$, for outputting at the output port the array of values $W^{(i)}(m,n)$, being equal to $Z^{(i+1)}(m/2,n/2)$ for m even and n even, equal to $T^{(i)}{}_{OO}((m-1)/2,n-1)/2)$ for m odd and n odd, equal to $T^{(i)}{}_{EO}(m/2,n-1)/2)$ for m even n odd, and equal to $T^{(i)}{}_{OE}((m-1)/2,n/2)$ for m odd and n even;

the second output port of the processing means being connected to input port of the synthesizer means so that the array $W^{(J)}(m,n)$ input to the input port of the synthesizer means is an output array of the processing means, whereby if the effect of the processing means is such that the array $Y^{(J)}(m,n)$ is approximately equal to the array $Y^{(J)}(m,n)$ and the arrays $T^{(i)}{}_{OO}(m,n)$, $T^{(i)}{}_{OE}(m,n)$ and $T^{(i)}{}_{EO}(m,n)$ respectively are approximately equal to the arrays $S^{(i)}{}_{OO}(m,n)$, $S^{(i)}{}_{OE}(m,n)$ and $S^{(i)}{}_{EO}(m,n)$ then the arrays $Z^{(i)}(m,n)$ will bee approximately equal to the respective arrays $$X^{(i)}\left(m - \sum_{t=i}^{J} M_t, n - \sum_{t=i}^{J} N_t\right).$$

24. A signal processor as in claim 23, wherein said second interleaver connecting means includes:
 a plurality, J in number, of buffer means $C_i$, where $i=1$ t J, each having an input port and an output port, for storing the respective array of values $W^{(i)}(m,n)$;
 a synthesizer buffer selector means for selectively connecting the output ports of the buffer means $C_i$, $i=1$ to J, to the array input port of the synthesizer means and for connecting input ports of the buffer means $C_i$, for $i=1$ to $J-1$, to the output port of the interleaver means; and
 means for providing the array $W^{(J)}(m,n)$ from the second output port of the processor means to the input port of the buffer means $C_J$.

25. A signal processor as in claim 23 wherein said synthesizing means comprises a first dimension synthesizer and a second dimension synthesizer, said first dimension synthesizer having an input port, an output port and means, responsive to the array of values $W^{(i)}(m,n)$ for each i, $i=1$ to J, for generating and outputting at its output port an array of output values $V_S{}^{(i)}(m,n)$ given by $$V^{(i)}{}_S(m,n) = \sum_{\substack{k=0 \\ k\text{ even}}}^{N_i-2} \beta^{(i)}{}_k W^{(i)}(m,n-k) +$$

$$\sum_{\substack{k=1 \\ k\text{ odd}}}^{N_i-1} \beta^{(i)}{}_k W^{(i)}(m,n-N_i+k) \quad \text{for } n \text{ even}$$

$$V^{(i)}{}_S(m,n) = -\sum_{\substack{k=0 \\ k\text{ even}}}^{N_i-2} \beta^{(i)}{}_k W^{(i)}(m,n-N_i+k) +$$

$$\sum_{\substack{k=1 \\ k\text{ odd}}}^{N_i-1} \beta^{(i)}{}_k W^{(i)}(m,n-k) \quad \text{for } n \text{ odd}$$

said second dimension synthesizer having an output port, an input port connected to the output port of the first dimension synthesizer, and means, responsive to the array of values $V_S{}^{(i)}(m,n)$ for $i=1$ to J, at its input port, for generating and outputting at its output port for $i=1$ to J, the array of output values $Z^{(i)}(m,n)$ given by $$Z^{(i)}(m,n) = \sum_{\substack{j=0 \\ j\text{ even}}}^{M_i-2} \alpha^{(i)}{}_j V^{(i)}{}_S(m-j,n) +$$

$$\sum_{\substack{j=1 \\ j\text{ odd}}}^{M_i-1} \alpha^{(i)}{}_j V^{(i)}{}_S(m-M_i+j,n) \quad \text{for } m \text{ even}$$

$$Z^{(i)}(m,n) = -\sum_{\substack{j=0 \\ j\text{ even}}}^{M_i-2} \alpha^{(i)}{}_j V^{(i)}{}_S(m-M_i+J,n) +$$

$$\sum_{\substack{j=1 \\ j\text{ odd}}}^{M_i-1} \alpha^{(i)}{}_j V^{(i)}{}_S(m-j,n). \quad \text{for } m \text{ odd}$$

26. A signal processor as in claim 23, wherein said interleaver means comprises first, second and third de-interleaving means, said first interleaving means having an output port and first and second input ports, and means, responsive to the arrays of $T^{(i)}{}_{OO}(m,n)$ and $T^{(i-)}{}_{EO}(m,n)$, for $i=1$ to $J-1$, values respectively at its first and second input port, for generating and outputting at its output port the array of values $U^{(i)}{}_I(m,n)$ equal to $T^{(i)}{}_{OO}((m-1)/2,n)$ for m odd and equal to $T^{(i-)}{}_{EO}(m/2,n)$ for m even, said second interleaving means having first and second input ports and an output port and means, responsive to the arrays of values $T^{(i)}{}_{OE}(m,n)$ respectively at its first and second input ports, for generating and outputting at its output port the arrays of values $V^{(i)}{}_I(m,n)$ equal to $T^{(i)}((m-1)/2,n)$, for m odd and equal to $Z^{i+1}(m/2,n)$ for m even, and said third interleaving means having a first input port connected to the output port of said first de-interleaving means, a second input port connected to the output port of the second de-interleaver means, and means, responsive to the arrays of values $V^{(i)}{}_I(m,n)$ at its first input port, and $V^{(i)}{}_I(m,n)$ at its second input port, for generating and outputting at its output port, the array of values $W^{(i)}(m,n)$ equal to $U^{(i)}{}_I(m,(n-1)/2)$ for n odd and equal to $V^{(i)}{}_I(m,n/2)$ for n even.

27. A signal processor as in claim 16 wherein said analyzer means includes
 a plurality, J in number, of successive two-dimensional analyzer circuits $AA_i$, where $i=1$ to J, each having an input port and an output port; and said de-interleaver means includes
 $J-1$ two-dimensional de-interleaver circuits $DD_i$, where $i=1$ to $J-1$, each having an input port and first and second output ports, for all i, $i=1$ to $J-1$, the input port of the de-interleaver $DD_i$ being connected to the output port of the analyzer circuit $AA_i$ and the first output port of the de-interleaver $D_i$ is connected to the input port of the analyzer circuit $AA_{i+1}$;
 each analyzer circuit $AA_i$ comprising means, responsive to a sequence of input values $X^{(i)}(m,n)$, for outputting at its output port the array of output values $Y^{(i)}(m,n)$, each de-interleaver circuit $DD_i$ having means, responsive to the array of values $Y^{(i)}(m,n)$, for outputting at the first output port the values $X^{(i+1)}(m,n)$ and for outputting at the second output port the arrays of values $S^{(i)}{}_{OO}(m,n)$, $S^{(i)}{}_{OE}(m,n)$ and $S^{(i)}{}_{EO}(m,n)$.

28. A signal processor as in claim 27, wherein $M_i = M$ and $N_i = N$ for all i, i=1 to J and M and N are even positive integers.

29. A signal processor as in claim 27, further comprising a plurality of processing means $PP_i$, J in number, for each value of i, said processing means $PP_i$ being coupled to the output port of the de-interleaver $DD_i$ for i=1 to J−1, for processing the respective arrays $S^{(i)}_{OO}(m,n)$, $S^{(i)}_{OE}(m,n)$ and $S^{(i)}_{EO}(m,n)$ and outputting at a first output port output arrays $T^{(i)}_{OO}(m,n)$, $T^{(i)}_{OE}(m,n)$ and $T^{(i)}_{EO}(m,n)$, and being coupled to the output ort of the analyzer circuit $AA_J$ for i=J for processing the array $Y^{(J)}(m,n)$ and outputting at a second output port an array $W^{(J)}(m,n)$.

30. A signal processor as in claim 29, wherein $M_i = M$ and $N_i = N$ for all i, i=1 to J and M and N are even positive integers.

31. A signal processor as in claim 27, further comprising a plurality, J in number, of successive two-dimensional synthesizer circuits $SS_i$, where i=1 to J, each having an input port and an output port; and J−1 interleaver circuits $II_i$, where i=1 to J−1, each having an output port and first and second input ports, for all i, i=1 to J−1, the output port of the interleaver circuit $II_i$ is connected to the input port of the synthesizer circuit $SS_i$, the first input port of the interleaver circuit $II_i$ is connected to the output port of the synthesizer circuit $SS_{i+1}$, and the second input port of the interleaver circuit $II_i$ is connected to the output port of the processing means $PP_i$;

each synthesizer circuit $SS_i$ comprising means, responsive to an array of input values $W^{(i)}(m,n)$ at its input port wherein m and n represents sequences of successive integers, for generating and outputting at its output port an array of output values $Z^{(i)}(m,n)$ given by $$Z^{(i)}(m,n) = \sum_{\substack{j=0 \\ j \text{ even}}}^{M_i-2} \sum_{\substack{k=0 \\ k \text{ even}}}^{N_i-2} \alpha^{(i)}_j \beta^{(i)}_k W^{(i)}(m-j, n-k) +$$

$$\sum_{\substack{j=0 \\ j \text{ even}}}^{M_i-2} \sum_{\substack{k=1 \\ k \text{ odd}}}^{N_i-1} \alpha^{(i)}_j \beta^{(i)}_k W^{(i)}(m-j, n-N_i+k) +$$

$$\sum_{\substack{j=1 \\ j \text{ odd}}}^{M_i-1} \sum_{\substack{k=0 \\ k \text{ even}}}^{N_i-2} \alpha^{(i)}_j \beta^{(i)}_k W^{(i)}(m-M_i+j, n-k) +$$

$$\sum_{\substack{j=1 \\ j \text{ odd}}}^{M_i-1} \sum_{\substack{k=1 \\ k \text{ odd}}}^{N_i-1} \alpha^{(i)}_j \beta^{(i)}_k W^{(i)}(m-M_i+j, n-N_i+k) \quad \text{for } m \text{ even and } n \text{ even}$$

$$Z^{(i)}(m,n) =$$

$$\sum_{\substack{j=0 \\ j \text{ even}}}^{M_i-2} \sum_{\substack{k=0 \\ k \text{ even}}}^{N_i-2} \alpha^{(i)}_j \beta^{(i)}_k W^{(i)}(m-M_i+j, n-N_i+k) -$$

$$\sum_{\substack{j=0 \\ j \text{ even}}}^{M_i-2N_i-1} \sum_{k=1} \alpha^{(i)}_j \beta^{(i)}_k W^{(i)}(m-M_i+j, n-k) -$$

$$\sum_{\substack{j=1 \\ j \text{ odd}}}^{M_i-1} \sum_{\substack{k=0 \\ k \text{ even}}}^{N_i-2} \alpha^{(i)}_j \beta^{(i)}_k W^{(i)}(m-j, n-N_i+k) +$$

-continued $$\sum_{\substack{j=1 \\ j \text{ odd}}}^{M_i-1} \sum_{\substack{k=1 \\ k \text{ odd}}}^{N_i-1} \alpha^{(i)}_j \beta^{(i)}_k W^{(i)}(m-j, n-k) \quad \text{for } m \text{ odd and } n \text{ odd}$$

the interleaver means being responsive to the arrays $T^{(i)}_{OO}(m,n)$, $T^{(i)}_{OE}(m,n)$ and $T^{(i)}_{EO}(m,n)$ at its second input port and to the array $Z^{(i+1)}(m,n)$ at its first input port for i=1 to J−1, for outputting at the output port the array of values $W^{(i)}(m,n)$, being equal to $Z^{(i+1)}(m/2, n/2)$ for m even and n even, equal to $T^{(i)}_{OO}((m-1)/2, (n-1)/2)$ for m odd and n odd, equal to $T^{(i)}_{EO}(m/2, (n-1)/2)$ for m even and n odd, and equal to $T^{(i)}_{OE}((m-1)/2, n/2)$ for m odd and n even;

the output port of the processing means $PP_J$ being connected to input port of the synthesizer circuit $SS_J$ so that the sequence $W^{(J)}(m,n)$ input to the input port of the synthesizer $SS_J$ is the output sequence of the processing means $PP_J$, whereby if the effect of the processing means $PP_i$, i=1 to J is such that for each i, i=1 to J−1) the arrays $T^{(i)}_{OO}(m,n)$, $T^{(i)}_{OE}(m,n)$ and $T^{(i)}_{EO}(m,n)$ are respectively approximately equal to the arrays $S^{(i)}_{OO}(m,n)$, $S^{(i)}_{OE}(m,n)$ and $S^{(i)}_{EO}(m,n)$ and $W^{(J)}(m,n)$ is approximately equal to $Y^{(J)}(m,n)$ then the arrays $Z^{(i)}(m,n)$ will be approximately equal to the respective arrays $$X^{(i)}\left(m - \sum_{t=i}^{J} N_t, n - \sum_{t=i}^{J} N_t\right).$$

32. A signal processor as in claim 31, wherein $M_i = M$ and $N_i = N$ for all i, i=1 to J and M and N are even positive integers and wherein for each i, i=1 to J, each j, j=0 to M−1 and each k, k=0 to N−1, $\alpha^{(i)}_j = \alpha_j$ and $\beta^{(i)}_k = \alpha_k$ where $\beta_j$, j=0 to M−1 and $\beta_k$, k=0 to N−1 are predetermined numerical values.

33. A single stage wavelet analyzer circuit for processing a sequence of values X(m) wherein m are successive integers, to obtain an output sequence Y(m) according to the equation $$Y(m) = \sum_{k=0}^{N-1} a_k X(m - N + k) \quad \text{for } m \text{ even}$$

$$Y(m) = \sum_{k=0}^{N-1} a_k (-1)^{k+1} X(m-k) \quad \text{for } m \text{ odd},$$

where N is a positive even integer, the wavelet analyzer circuit comprising:

first and second dual-convolver circuits and an analyzer-adjunct circuit, said first dual convolver circuit comprising means for convolving the sequence of values X(m) to obtain a first sequence $Y_1(m)$ at an output port thereof according to the equation $$Y_1(m) = \sum_{k=0}^{N/2-1} a_{2k} X(m - 2(N/2) + 2 + 2k) \quad \text{for } m \text{ even}$$

$$Y_1(m) = \sum_{k=0}^{N/2-1} a_{2k} X(m - 2k) \quad \text{for } m \text{ odd},$$

and said second dual convolver circuit comprising means for convolving the sequence of values X(m)

to obtain a second sequence $Y_2(m)$ at an output port thereof according to the equation $$Y_2(m) = \sum_{k=0}^{N/2-1} a_{N-1-2k} X(m - 2(N/2) + 2 + 2k) \text{ for } m \text{ even}$$

$$Y_2(m) = \sum_{k=0}^{N/2-1} a_{N-1-2k} X(m - 2k) \text{ for } m \text{ odd};$$

said analyzer-adjunct circuit comprising means, having input ports respectively connected to the output ports of said first and second dual convolver circuits, for processing the first and second sequences $Y_1(m)$ and $Y_2(m)$ to obtain the sequence $Y(m)$ according to the relation
$Y(m) = Y_1(m-2) + Y_2(m-1)$ for m even
$Y(m) = -Y_1(m) + Y_2(m-1)$ for m odd; and
the values $\beta_k$, $k=0$ to $N-1$, are numerical constants which satisfy for all even integers j the equation $$\sum_{k=0}^{N-1} \beta_k \beta_{k+j} = \delta(j)$$

where $\delta(j) = 1$ for $j = 0$ and $\delta(j) = 0$ for $j \neq 0$.

34. A circuit as in claim 33, wherein said first and second dual-convolvers each includes a plurality of scaler multipliers $e_k$, $k=0$ to $L-1$, $L=N/2$, for respectively multiplying each value $X(m)$ by a corresponding scaler value, each of said scaler multipliers having an output port;
  a first adder $AD_O$ having a first input port connected to the output port of the scaler $e_O$, a second input port and first and second output ports;
  a plurality of adders $AD_k$, $k=1$ to $L-2$, the $(k+1)$th adder $AD_k$ having a first input port connected to the output port of the scaler $e_k$, second and third input ports and first and second output ports;
  an Lth adder $AD_{L-1}$ having a first input port connected to the output port of the scaler $e_{L-1}$, a second input port and first and second output ports;
  a plurality of delay and switch means $V_k$, k 32 0 to $L-3$, respectively disposed between the $(k+1)$th and $(k+2)$th adders $AD_k$ and $AD_{k+1}$, each delay and switch means $V_k$ including a first two sample delay element $Z_{k1}^{-2}$, a second two sample delay element $Z_{k2}^{-2}$, a first switch $SW_{k1}$ alternately connecting the first output port of the $(k+1)$th adder $AD_k$ to an input port of the first two sample delay element $Z_{k1}^{-2}$ in a first state of the circuit and the second input port of the $(k+1)$th adder $AD_k$ to an output port of the second two sample delay element $Z_{k2}^{-2}$ in a second state of the circuit, and a second switch $SW_{k2}$ alternately connecting the third input port of the $(k+2)$th adder $AD_{k+1}$ to an output port of the first two sample delay element $Z_{k1}^{-2}$ in the first state of the circuit and the second outport port of the $(k+2)$th adder $AD_{k+1}$ to an input port of the second two sample delay element $Z_{K2}^{-2}$ in the second state of the circuit;
  an $(L-1)$th delay and switch means $V_{L-2}$, disposed between the $(L-1)$th and Lth adders $AD_{L-2}$ and $AD_{L-1}$, and including a first two sample delay element $Z_{(L-2)1}^{-2}$ and a second two sample delay element $Z_{(L-2)2}^{-2}$, a first switch $SW_{(L-2)1}$ alternately connecting the first output port of the $(L-1)$th adder $AD_{L-2}$ to an input port of the first two sample delay element $Z_{(L-2)1}^{-2}$ in the first state of the circuit and the second input port of the $(L-1)$th adder $AD_{L-2}$ to an output port of the second two sample delay element $Z_{(L-2)2}^{-2}$ in the second state of the circuit, and a second switch $SW_{(L-2)2}$ alternately connecting the second input port of the Lth adder $AD_{L-1}$ to an output port of the first two sample delay element $Z_{(L-2)1}^{-2}$ in the first state of the circuit and the second output port of the Lth adder $AD_{L-1}$ to an input port of the second two sample delay element $Z_{(L-2)2}^{-2}$ in the second state of the circuit; and
  means for controlling the first and second switches of said delay and switch means $V_k$, $k=0$ to $L-2$ to alternate the first and second states of the circuit with successive value $X(m)$ such that the first state corresponds to values $X(m)$ when m is an even integer and the second state corresponds to values $X(m)$ when m is an odd integer, the first through $(L-1)$th adders $AD_k$, $k=0$ to $L-2$ providing at the second output port thereof a sum of input values at the first and second input ports thereof when the circuit is in said second state, the first through $(L-1)$th adders $AD_k$, $k=0$ to $L-2$ providing at the second output port thereof a sum of input values at the first and second input ports thereof when the circuit is in said second state, the Lth adder $AD_{L-1}$ providing at the second output port thereof the value at the first input port thereof when the circuit is in said second state, the second through $(L-1)$th adders $AD_k$, $k=1$ to $(L-2)$ providing at the first output port thereof a sum of input values at the first and third input ports thereof when the circuit is in said first state, the Lth adder $AD_L$, providing at the first output port thereof a sum of input values at the first and second input ports thereof when the circuit is in said first state, the first adder $AD_0$ providing at the first output port thereof the value at the first input port thereof when the circuit is in said first state;
  wherein the respective scalers $e_k$ of the first dual convolver have scaler values equal to $a_{2k}$ and the respective scalers $e_k$ of the second dual convolver have scaler values equal to $a_{N-1-2k}$.

35. A single stage wavelet synthesizer circuit for processing a sequence of values $W(m)$ wherein m designates success integers, to obtain an output sequence $Z(m)$ according to the equation $$Z(m) = \sum_{\substack{k=0 \\ k \text{ even}}}^{N-2} \beta_k W(m - k) + \sum_{\substack{k=1 \\ k \text{ odd}}}^{N-2} \beta_k W(m - N + k) \text{ for } m \text{ even}$$

$$Z(m) = \sum_{\substack{k=0 \\ k \text{ even}}}^{N-2} \beta_k W(m - N + k) + \sum_{\substack{k=1 \\ k \text{ odd}}}^{N-2} \beta_k W(m - k) \text{ for } m \text{ odd}$$

where N is a positive even integer, the circuit comprising:
  first and second dual-convolvers circuits and an analyzer-adjunct circuit, said first dual convolver comprising means for convolving the sequence of values $W(m)$ to obtain a first sequence $Z_1(m)$ at an output port thereof according to the equation $$Z_1(m) = \sum_{k=0}^{N/2-1} a_{N-2-2k}X(m - N + 2 + 2k) \quad \text{for } m \text{ even}$$

$$Z_1(m) = \sum_{k=0}^{N/2-1} a_{N-2-2k}X(m - 2k) \quad \text{for } m \text{ odd,}$$

and said second dual convolver comprising means for convolving the sequence of values W(m) to obtain a second sequence $Z_2(m)$ at an output port thereof according to the equation $$Z_2(m) = \sum_{k=0}^{N/2-1} a_{N-1-2k}X(m - N + 2 + 2k) \quad \text{for } m \text{ even}$$

$$Z_2(m) = \sum_{k=0}^{N/2-1} a_{N-1-2k}X(m - 2k) \quad \text{for } m \text{ odd;}$$

said synthesizer-adjunct circuit comprising means, having input ports respectively connected to the output ports of said first and second dual convolver circuits, for processing the first and second sequences $Z_1(m)$ and $Z_2(m)$ to obtain the sequence Z(m) according to the relation
 Z(m)=Z_1(m)+Z_2(m-1) for m even
 Z(m)=-Z_1(m-2)+Z_2(m-1) for m odd
wherein the values $\beta_k$, k=0 to N−1 are numerical constants which satisfy for all even integers j the equation $$\sum_{k=0}^{N-1} \beta_k\beta_{k+j} = \delta(j) \text{ where } \begin{array}{l}\delta(j) = 1 \text{ for } j = 0 \\ \delta(j) = 0 \text{ for } j \neq 0.\end{array}$$

36. A circuit as in claim 35, wherein said first and second dual-convolvers each includes a plurality of scalers $e_k$, k=0 to L−1, where L is a positive integer greater than 2, for respectively multiplying each value X(m) by a corresponding scaler value, each of said scalers having an output port;
 a first adder $AD_0$ having a first input port connected to the output port of the scaler $e_0$, a second input port and first and second output ports;
 a plurality of adders $AD_k$, k=1 to L−2, the (k+1)th adder $AD_k$ having a first input port connected to the output port of the scaler $e_k$, second and third input ports and first and second output ports;
 an Lth adder $AD_{L-1}$ having a first input port connected to the output port of the scaler $e_{L-1}$, a second input port and first and second output ports;
 a plurality of delay and switch means $V_k$, k=0 to L−3, respectively disposed between the (k+1)th and (k+2)th adders $AD_k$ and $AD_{k+1}$, each delay and switch means $V_k$ including a first two sample delay element $Z_{k1}^{-2}$, a second two sample delay element $Z_{k2}^{-2}$, a first switch $SW_{kl}$ alternately connecting the first output port of the (k+1)th adder $AD_k$ to an input port of the first two sample delay element $Z_{K1}^{-2}$ in a first state of the circuit and the second input port of the (k+1)th adder $AD_k$ to an output port of the second two sample delay element $Z_{k2}^{-2}$ in a second state of the circuit, and a second switch $SW_{k2}$ alternately connecting the third input port of the (k+2)th adder $AD_{k+1}$ to an output port of the first two sample delay element $Z_{k1}^{-2}$ in th first state of the circuit and the second outport port of the (k+2)th adder $AD_{k+1}$ to an input port of the second two sample delay element $Z_{k2}^{-2}$ in the second state of the circuit;
 an (L−1)th delay and switch means $V_{L-2}$ disposed between the (L−1)th and Lth adders $AD_{L-2}$ and $AD_{L-1}$, and including a first two sample delay element $Z_{(L-2)1}^{-1}$ and a second two sample delay element $Z_{(L-2)2}^{-2}$, a first switch $SW_{(L-2)1}$ alternately connecting the first output port of the (L−1)th adder $AD_{L-2}$ to an input port of the first two sample delay element $Z_{(L-2)1}^{-2}$ in the first state of the circuit and the second input port of the (L−1)th adder $AD_{L-2}$ to an output port of the second two sample delay element $Z_{(L-2)2}^{-2}$ in the second state of the circuit, and a second switch $SW_{(L-2)2}$ alternately connecting the second input port of the Lth adder $AD_{L-1}$ to an output port of the first two sample delay element $Z_{(L-2)1}^{-2}$ in the first state of the circuit and the second output port of the Lth adder $AD_{L-1}$ to an input port of the second two sample delay element $Z_{(L-2)2}^{-2}$ in the second state of the circuit; and
 means for controlling the first and second switches of said delay and switch means $V_k$, k=0 to L−2 to alternate the first and second states of the circuit with successive value X(m) such that the first state corresponds to values X(m) when m is an even integer and the second state corresponds to values X(m) when m is an odd integer the first through (L−)th adders $AD_k$, k=0 to L−2 providing at the second output port thereof a sum of input values at the first and second input ports thereof when the circuit is in said second state, the first through (L−1)th adders $AD_k$, k=0 to L−2 providing at the second output port thereof a sum of input values at the first and second input ports thereof when the circuit is in said second state, the Lth adder $AD_{L-1}$ providing at the second output port thereof the value at the first input port thereof when the circuit is in said second state, the second through (L−1)th adders $AD_k$, k=1 to L−2 providing at the first output port thereof a sum of input values at the first and third input ports thereof when the circuit is in said first state, the Lth adder $AD_L$, providing at the first output port thereof a sum of input values at the first and second input ports thereof when the circuit is in said first state, the first adder $AD_0$ providing at the first output port thereof the value at the first input port thereof when the circuit is in said first state;
 wherein the respective scalers $e_k$ of the first dual convolver have scaler values equal to $a_{N-2-2k}$ and the respective scalers $e_k$ of the second dual convolver have scaler values equal to $a_{N-1-2k}$.

37. A function generator, comprising:
 a source of null sequences;
 a plurality, J in number, of successive synthesizer circuits $S_i$, where i=1 to J, each having an input port and an output port; and
 J−1 interleaver circuits $I_i$, where i=1 to J−1, each having an output port and a data input port and a null input port, for all i, i=1 to J−1, the output port of the interleaver $I_i$ is connected to the input port of the synthesizer circuit $S_i$, the data input port of the interleaver $I_i$ is connected to the output port of the synthesizer circuit $S_{i+1}$, and the null input port of the interleaver $I_i$ is connected to the output port of the processing means $P_i$; each synthesizer circuit $S_i$ comprising means, responsive to a sequence of input values $W^{(i)}(m)$ at its input port wherein m represents success integers, for generating and outputting at its output port a sequence of output values $Z^{(i)}(m)$ given by $$Z^{(i)}(m) = \sum_{\substack{k=0 \\ k \text{ even}}}^{N_i-2} a^{(i)}_k W^{(i)}(m-k) +$$

$$\sum_{\substack{k=1 \\ k \text{ odd}}}^{N_i-1} a^{(i)}_k W^{(i)}(m-N_i+k) \text{ for } m \text{ even}$$

$$Z^{(i)}(m) = - \sum_{\substack{k=0 \\ k \text{ even}}}^{N_i-2} a^{(i)}_k W^{(i)}(m-N_i+k) +$$

$$\sum_{\substack{k=1 \\ k \text{ odd}}}^{N_i-1} a^{(i)}_k W^{(i)}(m-k) \text{ for } m \text{ odd},$$

each interleaver circuit $I_i$ having means for outputting at the output port the sequence of values $W^{(i)}(m)$, being equal to $Z^{(i+1)}(m/2)$ for m even and equal to $T^{(i)}((m-1)/2)$ for m odd, the output port of the processing means $P_J$ being connected to input port of the synthesizer circuit $S_J$ so that the sequence $W^{(J)}(m)$ input to the input port of the synthesizer $S_J$ is the output sequence of the processing means $P_J$, whereby if the effect of the processing means $P_i$, i=1 to J is such that the sequences $T^{(i)}(m)$ are respectively approximately equal to the sequences $S^{(i)}(m)$, then the sequences $Z^{(i)}(m)$ are approximately equal to the respective sequences $$X^{(i)}\left(m - \sum_{t=i}^{J} N_t\right).$$

* * * * *